United States Patent
Jeon et al.

(10) Patent No.: US 10,677,496 B2
(45) Date of Patent: Jun. 9, 2020

(54) COMPRESSOR DRIVING APPARATUS AND CHILLER INCLUDING THE SAME

(71) Applicant: LG ELECTRONICS INC., Seoul (KR)

(72) Inventors: Jonghyun Jeon, Seoul (KR); Joonsik An, Seoul (KR); Keunwoo Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 248 days.

(21) Appl. No.: 15/863,314

(22) Filed: Jan. 5, 2018

(65) Prior Publication Data
US 2018/0195772 A1 Jul. 12, 2018

(30) Foreign Application Priority Data
Jan. 6, 2017 (KR) .................... 10-2017-0002513

(51) Int. Cl.
*F04D 29/058* (2006.01)
*F25B 1/00* (2006.01)
(Continued)

(52) U.S. Cl.
CPC ............ *F25B 1/005* (2013.01); *F04D 13/026* (2013.01); *F16C 32/0442* (2013.01);
(Continued)

(58) Field of Classification Search
CPC .............. F04D 13/026; F16C 32/0442; F16C 32/0444; F16C 32/0451; F16C 32/0457;
(Continued)

(56) References Cited

U.S. PATENT DOCUMENTS 5,574,345 A   11/1996 Yoneta et al.
5,917,297 A    6/1999 Gerster et al.
(Continued)

FOREIGN PATENT DOCUMENTS

DE        195 06 849      8/1995
DE   10 2006 019 875     10/2007
(Continued)

OTHER PUBLICATIONS

International Search Report (PCT/ISA/210) dated Apr. 30, 2018 issued in International Application No. PCT/KR2018/000235.
(Continued)

*Primary Examiner* — Muhammad S Islam
(74) *Attorney, Agent, or Firm* — Ked & Associates, LLP

(57) ABSTRACT

The present disclosure relates to a chiller. A compressor driver includes: a compressor including a compressor motor and a magnetic bearing; a coil driver including a switching element and to apply a current to a bearing coil of the magnetic bearing by a switching operation of the switching element to cause a rotor of the compressor motor to be levitated from or land on the magnetic bearing; and a controller to control the switching element of the coil driver, wherein, when the rotor of the compressor motor lands, the controller is configured to gradually decrease the current flowing through the bearing coil. Accordingly, damage to the rotor of the compressor motor can be prevented when the compressor motor is stopped in a magnetic levitation system.

20 Claims, 23 Drawing Sheets

(51) Int. Cl.
  *H02K 7/09* (2006.01)
  *F25D 17/02* (2006.01)
  *F24F 3/06* (2006.01)
  *F04D 13/02* (2006.01)
  *F16C 32/04* (2006.01)

(52) U.S. Cl.
  CPC ...... *F16C 32/0444* (2013.01); *F16C 32/0451* (2013.01); *F16C 32/0457* (2013.01); *F24F 3/06* (2013.01); *F25D 17/02* (2013.01); *H02K 7/09* (2013.01)

(58) Field of Classification Search
  CPC . F24F 3/06; F25B 1/005; F25D 17/02; H02K 7/09
  See application file for complete search history.

(56) References Cited

U.S. PATENT DOCUMENTS

| | | | |
|---|---|---|---|
| 7,340,912 B1* | 3/2008 | Yoho, Sr. | F24F 3/1423 62/305 |
| 2002/0047402 A1 | 4/2002 | Taniguchi et al. | |
| 2004/0245877 A1 | 12/2004 | Khalizadeh | |
| 2006/0125436 A1 | 6/2006 | Lin | |
| 2009/0009017 A1 | 1/2009 | Miyagawa et al. | |
| 2009/0174270 A1 | 7/2009 | Denk et al. | |
| 2014/0175925 A1 | 6/2014 | Barada | |
| 2014/0363321 A1* | 12/2014 | Sakawaki | F04D 29/058 417/423.12 |
| 2016/0377086 A1 | 12/2016 | Lee et al. | |

FOREIGN PATENT DOCUMENTS

| | | |
|---|---|---|
| DE | 10 2016 208 341 | 9/2016 |
| EP | 0 825 702 | 2/1998 |
| JP | 2009-014084 | 1/2009 |
| JP | 2014-114869 | 6/2014 |
| KR | 10-2005-0011732 | 11/2005 |
| KR | 10-2016-0068462 | 6/2016 |
| KR | 10-2017-0001295 | 1/2017 |
| WO | WO 02/21674 | 3/2002 |

OTHER PUBLICATIONS

European Search Report dated May 17, 2018 issued in European Application No. EP 18150392.1.

* cited by examiner

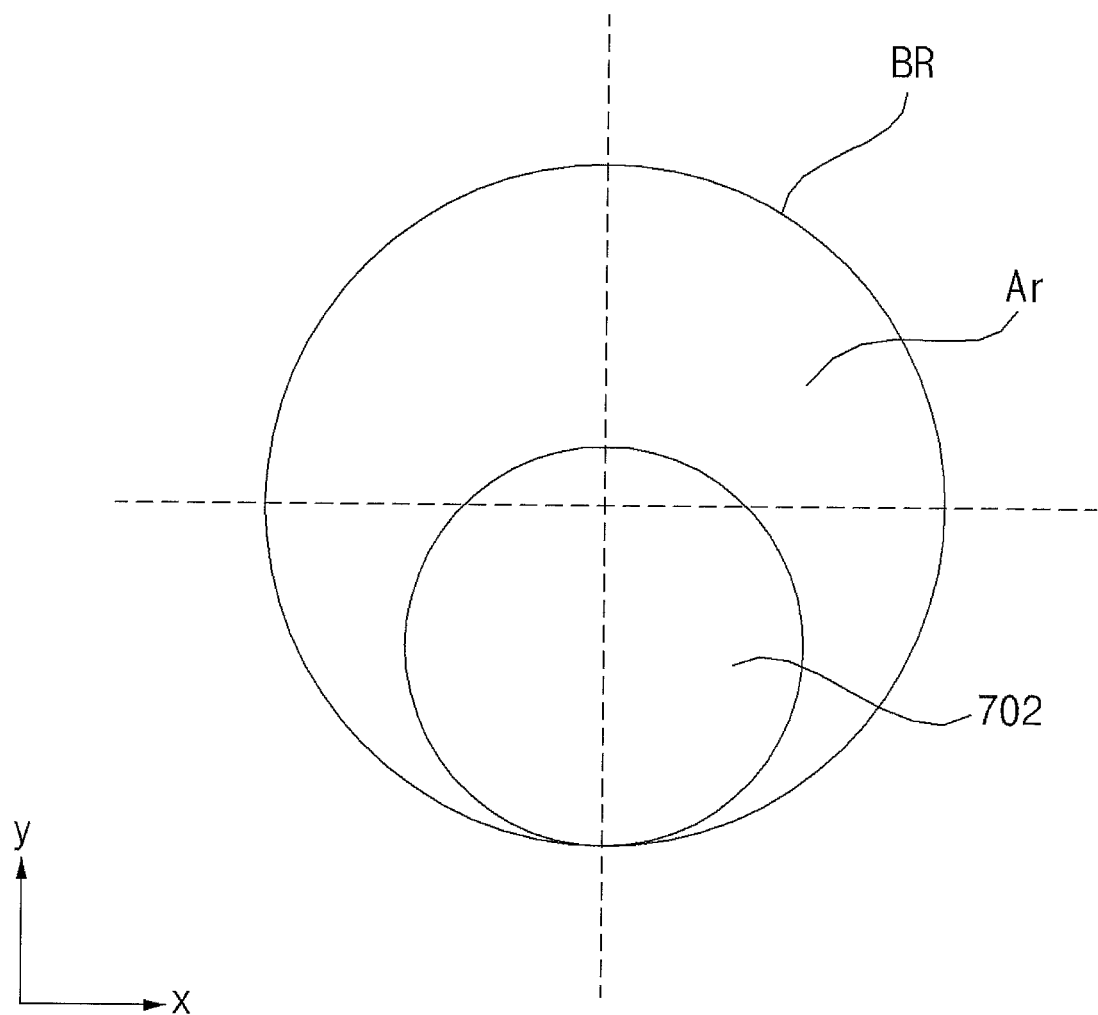

221a

COMPRESSOR DRIVING APPARATUS AND CHILLER INCLUDING THE SAME

CROSS-REFERENCE TO RELATED APPLICATION

This application claims priority under 35 U.S.C. § 119 to Korean Application No. 10-2017-0002513, filed on Jan. 6, 2017, whose entire disclosure is hereby incorporated by reference.

BACKGROUND

1. Field

The present disclosure relates to a compressor driving apparatus and a chiller including the same, and, more particularly, to a chiller that can prevent damage to the rotor of a compressor motor when the compressor motor is stopped in a magnetic levitation system.

2. Background

An air conditioner is a device that directs cold or warm air into a room to create a comfortable interior environment. The air conditioner is installed to provide a more comfortable environment for humans by adjusting the room temperature and purifying indoor air. Typically, the air conditioner includes an indoor unit composed of a heat exchanger and installed indoors, and an outdoor unit composed of a compressor, a heat exchanger, etc. and supplying refrigerant to the indoor unit.

A chiller for the air conditioner, which is used in places of business or buildings larger than homes, typically includes a cooling tower installed outdoors on a rooftop and a heat exchanger unit for circulating a refrigerant and transferring heat between refrigerant and cooling water sent from the cooling tower. Further, the heat exchanger unit includes a compressor, a condenser, and an evaporator.

The chiller often uses a method in which, when driving the compressor motor, the rotor of the compressor motor is magnetically levitated by a magnetic force formed by passing a current through a bearing coil, and then the rotor is rotated without mechanical friction. This method is called a magnetic bearing method or a magnetic levitation method.

By the way, after the compressor rotor is levitated, if the current passed through the bearing coils is cut off when the compressor motor is stopped, the magnetic force disappears and the rotor being levitated falls rapidly. While this fall occurs, a physical impact is generated, which may cause wear, damage, etc., on the parts within the compressor.

BRIEF DESCRIPTION OF THE DRAWINGS

The embodiments will be described in detail with reference to the following drawings in which like reference numerals refer to like elements wherein:

FIGS. 8A to 8C are views to be used as a reference to explain the levitation and landing of a rotor in a bearing;

DETAILED DESCRIPTION

Hereinafter, the present disclosure will be described in more detail with reference to the drawings. The suffixes "module" and "unit" for components used in the description below are assigned or mixed in consideration of easiness in writing the specification and, do not have distinctive meanings or roles by themselves. Thus, the suffixes "module" and "unit" may be used interchangeably.

Figure 1:
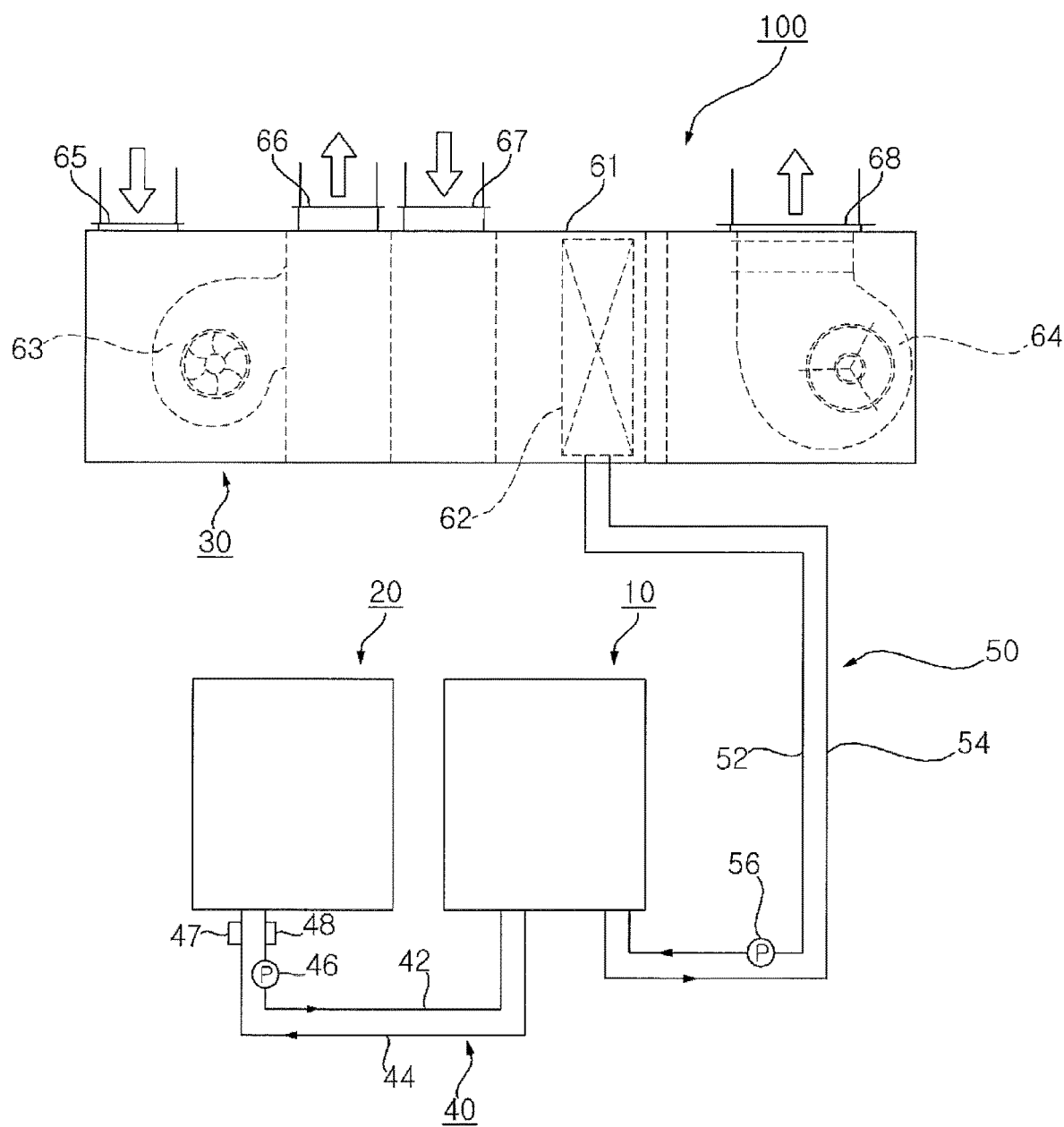
FIG. 1 is a view showing a configuration of a chiller according to an exemplary embodiment of the present disclosure.

FIG. 1 is a view showing a configuration of a chiller according to an exemplary embodiment of the present disclosure. Referring to the drawing, the chiller 100 includes an air conditioning unit (or air conditioner) 10 where a refrigeration cycle is formed, a cooling tower 20 for supplying cooling water to the air conditioning unit 10, and a place 30 of chilled water consumption where chilled water exchanging heat with the air conditioning unit 10 is circulated. The place 30 of chilled water consumption corresponds to a system or space that performs air conditioning using chilled water.

A circulation pathway 40 through which cooling water flows is installed between the air conditioning unit 10 and the cooling tower 20 to circulate the cooling water between the air conditioning unit 10 and the cooling tower 20. The cooling water circulation pathway 40 includes a cooling water entry path 42 for guiding cooling water into the condenser 12 and a cooling water exit path 44 for guiding the cooling water heated in the air conditioning unit 10 to the cooling tower 20.

Figure 2:
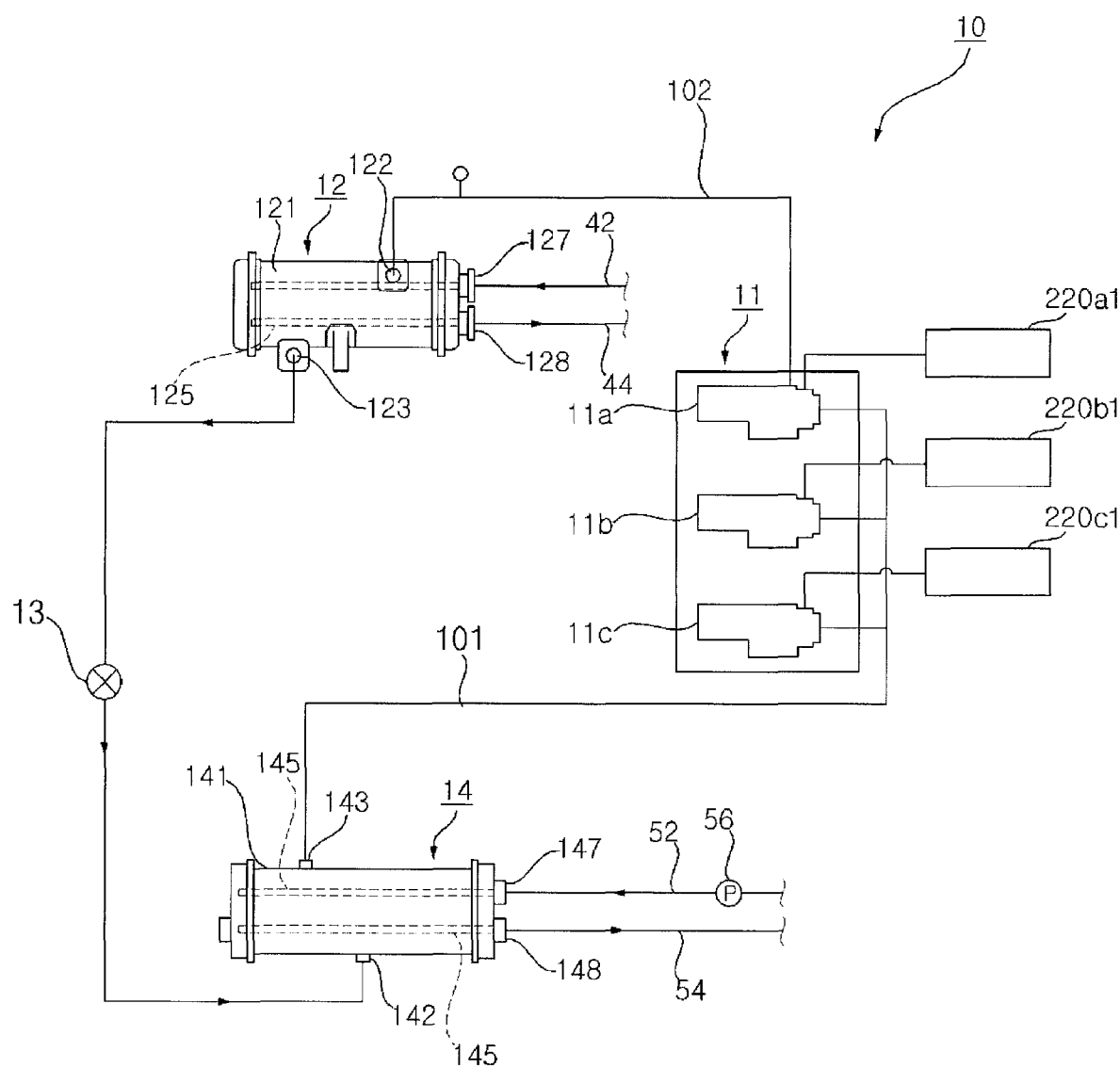
FIG. 2 is a view showing in more detail the air conditioning unit of FIG. 1.

A cooling water pump 46 may be installed on at least either the cooling water inlet path 42 or the cooling water exit path 44 for the flow of cooling water. For example, FIG. 2 illustrates the cooling water pump 46 installed on the cooling water entry path 42.

Also, an outlet temperature sensor 47 for sensing the temperature of the cooling water introduced into the cooling tower 20 may be installed on the cooling water exit path 44, and an inlet temperature sensor 48 for measuring the temperature of the cooling water coming out of the cooling tower 20 may be installed on the cooling water inlet path 42.

A chilled water circulation pathway 50 may be installed between the air conditioning unit 10 and the place 30 of chilled water consumption to circulate cooling water between them. In order to make chilled water circulate between the place 30 of chilled water consumption and the air conditioning unit 10, the chilled water circulation pathway 50 includes a chilled water inlet path 52 and a chilled water outlet path 54 for guiding the chilled water cooled in the air conditioning unit 10 to the place 30 of chilled water consumption.

Moreover, a chilled water pump 56 for circulating chilled water is provided on at least either the chilled water inlet path 52 and the chilled water outlet path 54. FIG. 2 illustrates the chilled water pump 56 installed on the chilled water inlet path 52.

In this exemplary embodiment, the place 30 of chilled water consumption is illustrated as a water-cooled air conditioner that transfers heat between the air and chilled water. In an example, the place 30 of chilled water consumption may include at least one among an air handling unit (AHU) or air handler that mixes indoor air and outdoor air and introduces the mixed air into the room after transferring chilled water, a fan coil unit (FCU) or fan coiler that is installed indoors and expels indoor air into the room after transferring heat to the chilled water, and a floor plumbing unit buried in the floor of the room. FIG. 1 shows the place 30 of chilled water consumption configured as an air handling unit.

The place 30 of chilled water includes a casing 61, a chilled water coil 62 installed within the casing 61, through which chilled water passes, and blowers 63 and 64 provided on both sides of the chilled water coil 62 for drawing in indoor air and outdoor air and blowing them into the room. Also, the blowers include a first blower 63 for drawing indoor air and outdoor air into the casing 61 and a second blower 64 for exhausting air-conditioned air out of the casing 61. The casing 61 includes an indoor air intake part 65, an indoor air exhaust part 66, an outdoor air intake part 67, and an air-conditioned air exhaust part.

When the blowers 63 and 64 are driven, part of the air drawn in through the indoor air intake part 65 is exhausted to the indoor air exhaust part 66, and the remaining air is mixed with the outdoor air drawn into the outdoor air intake part 67 and then passes through the chilled water coil 62, whereby heat transfer is done. After the heat transfer, the mixed air is introduced into the room through the air-conditioned air exhaust part 68.

FIG. 2 is a view showing in more detail the air conditioning unit of FIG. 1. Referring to the drawing, the air conditioning unit 10 include a compressor 11 for compressing a refrigerant, a condenser 12 into which high-temperature, high-pressure refrigerant compressed by the compressor 11 is introduced, an expander 13 for reducing the pressure of the refrigerant condensed by the condenser 12, an evaporator 14 for evaporating the refrigerant whose pressure is reduced by the expander 13, and a drive unit 220 for running the compressor 11.

The air conditioning unit 10 includes an intake pipe 101 installed at the inlet of the compressor 11 and guiding the refrigerant coming from the evaporator 14 to the compressor 11, and an exhaust pipe 102 installed at the outlet of the compressor 11 and guiding the refrigerant coming from the compressor 11 to the condenser 12. The condenser 12 and the evaporator 14 may be configured as shell-and-tube heat exchangers to allow heat transfer between the refrigerant and water.

The condenser 12 may include a shell 121 forming the exterior appearance, an inlet port 122 installed at one side of the shell 121 to introduce the refrigerant compressed by a plurality of compressors 11a, 11b, and 11c, and an outlet port 123 installed at the other side of the shell 121 to let out the refrigerant condensed by the condenser 12.

Also, the condenser 12 includes a cooling water pipe 125 for guiding the flow of cooling water within the shell 121, an inlet part 127 installed at an end of the shell 121 and guiding the cooling water supplied from the cooling tower 20 into the cell through the entry path 42, and an outlet part 128 for expelling cooling water from the condenser 12 to the cooling tower 20 through the exit path 44. In the condenser 12, cooling water flows through the cooling water pipe 125, and heat transfer is done between the cooling water and the refrigerant inside the shell 121 introduced into the condenser 12 through the refrigerant inlet port 122.

The evaporator 14 includes a shell 141 forming the exterior appearance, an inlet port 142 installed at one side of the shell 141 to introduce the refrigerant expanded by the expander 13, and an outlet port 143 installed at the other side of the shell 141 to let out the refrigerant evaporated by the evaporator 14 to the compressor 11. The intake pipe 101 is connected to the outlet port 143 so that the evaporated refrigerant is delivered from the evaporator 14 to the compressor 11.

Furthermore, the evaporator 14 includes a chilled water pipe 145 installed within the shell 141 and guiding the flow of chilled water, an inlet part 141 installed at one side of the shell 141 to introduce chilled water to the chilled water pipe 145, and an outlet part 148 for expelling the chilled water circulated in the evaporator 14. The chilled water inlet path 52 and the chilled water outlet path 54 are connected to the inlet part 141 and the outlet part 148, respectively, to allow chilled water to circulate through the chilled water coil 62 of the place 30 of chilled water consumption.

A plurality of drive units 220a1, 220b1, and 220c1 may run the plurality of compressors 11a, 11b, and 11c, respectively. The plurality of drive units 220a1, 220b1, and 220c1 each may internally have a converter, an inverter, etc.

Figure 3:
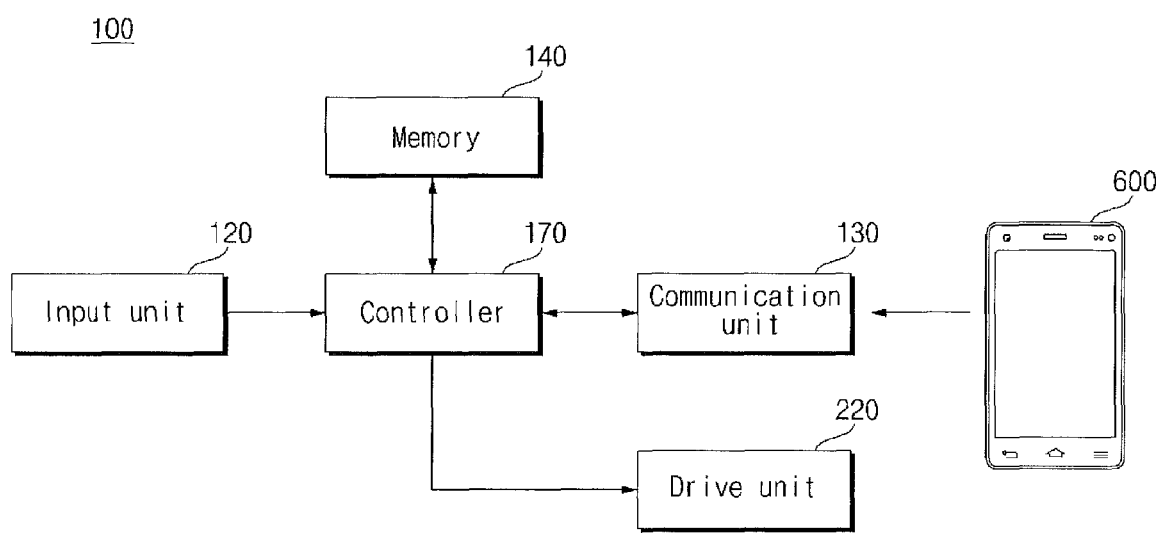
FIG. 3 is an exemplary internal block diagram of the chiller of FIG. 1.

FIG. 3 is an exemplary internal block diagram of the chiller of FIG. 1. The chiller 100 may have an input unit 120, a communication unit 130, a memory 140, a controller (or processor) 170, and a drive unit 220. The input part 120 has a manipulation button, keys, etc., and may output an input signal for powering on/off the chiller 100, setting up its operation, and so on.

Particularly, the input part 120 may have a plurality of switches that are assigned IDs corresponding to the plurality of drive units 220a1, 220b1, and 220c1, in relation to the exemplary embodiment of the present disclosure. In this case, the plurality of switches are hardware switches, and may include dip switches or tact switches. For example, the plurality of switches may be first to third switches 122P1, 122P2, and 122P3 that are assigned IDs corresponding to the plurality of drive units 220a1, 220b1, and 220c1.

The communication part 130 may exchange data in a wired or wireless manner with a neighboring device—for example, a remote controller or a mobile terminal 600. For example, infrared (IR) communication, RF communication, Bluetooth communication, Zigbee communication, WiFi communication, etc.

Meanwhile, the memory 140 of the chiller 100 may store data required for the operation of the chiller 100. For example, it may store data about the operating time, operating mode, etc. of the drive unit 220. Moreover, the memory 140 of the chiller 100 may store management data including information about the power consumption, recommended operations, current operation, and product management of the chiller. In addition, the memory 140 of the chiller 100 may store diagnostic data including information about how the chiller is running and operating and whether there is an error or not.

The controller 170 may control the units within the chiller 100. For example, the controller 170 may control the input unit 120, the communication unit 130, the memory 140, the drive unit 220, etc. In this case, as shown in FIG. 2, the drive unit 220 may include a plurality of drive units 220a1, 220b1, and 220c1.

Figure 4:
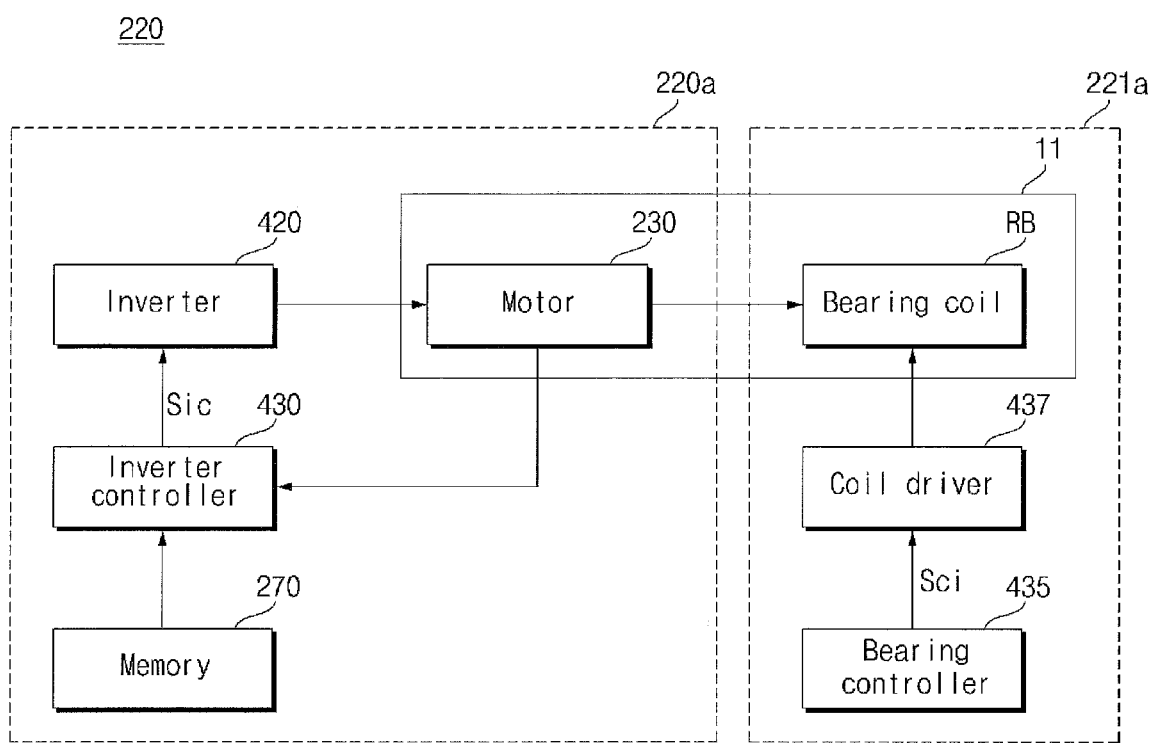
FIG. 4 illustrates an exemplary internal block diagram of the motor drive unit of FIG. 3.

Meanwhile, the plurality of drive units 220a1, 220b1, and 220c1 each may internally have an inverter 420, an inverter controller 430, and a motor 230, as shown in FIG. 4, in order to run the plurality of compressors 11a, 11b, and 11c. The controller 170 may control the plurality of drive units 220a1, 220b1, and 220c1 to operate selectively depending on the size of the demand load. Specifically, the controller 170 may control the inverters 420a, 420b, and 420c within the plurality of drive units 220a1, 220b1, and 220c1 to operate selectively depending on the size of the demand load.

Meanwhile, the controller 170 may control the plurality of corresponding drive units to operate depending on the turn-on state of the plurality of switches. Particularly, the controller 170 may control the plurality of drive units to operate selectively depending on the turn on state of the plurality of switches and the size of the demand load.

Meanwhile, the compressor motor drive unit described in this specification may be a sensorless motor driving apparatus which is capable of estimating the rotor position of the motor without a position sensing part, such as a hall sensor for sensing the rotor position of the motor.

FIG. 4 illustrates an exemplary internal block diagram of the compressor drive unit of FIG. 3. Referring to the drawing, the compressor 11 may internally have a motor 230 and a bearing coil RB.

Accordingly, the compressor drive unit 220 may include a compressor motor drive unit (or compressor motor driver) 220a for driving the compressor motor and a bearing drive unit (or bearing driver) 221a for driving the bearing coil RB. In this specification, the compressor drive unit 220 also may be called a compressor driving apparatus or compressor driver.

The bearing drive unit (or bearing driver) 221a may control the motor's rotor (not shown) for driving the impeller in the compressor 11 to be levitated or land. To this end, the bearing drive unit 221a may include a bearing controller 435, a coil driver 437, and a bearing coil RB.

The bearing controller 435 may receive gap information from a gap sensor (CB of FIG. 9A) provided near the bearing coil and information IB on the current applied to the bearing coil RB from a bearing coil current detector (M of FIG. 9A), and may output a switching control signal Sci for controlling the coil driver 437, based on the received gap information and current information IB.

The coil driver 437 may turn on/off switching elements based on the switching control signal Sci. By the turning on or off of the switching elements in the coil driver 437, a magnetic field may be generated in or disappear from the bearing coil RB, causing the rotor (not shown) of the motor to be levitated or land. Meanwhile, the compressor motor drive unit 220a in the compressor drive unit 220 of FIG. 4 may have a memory 270, an inverter controller 430, and an inverter 420.

Figure 5:
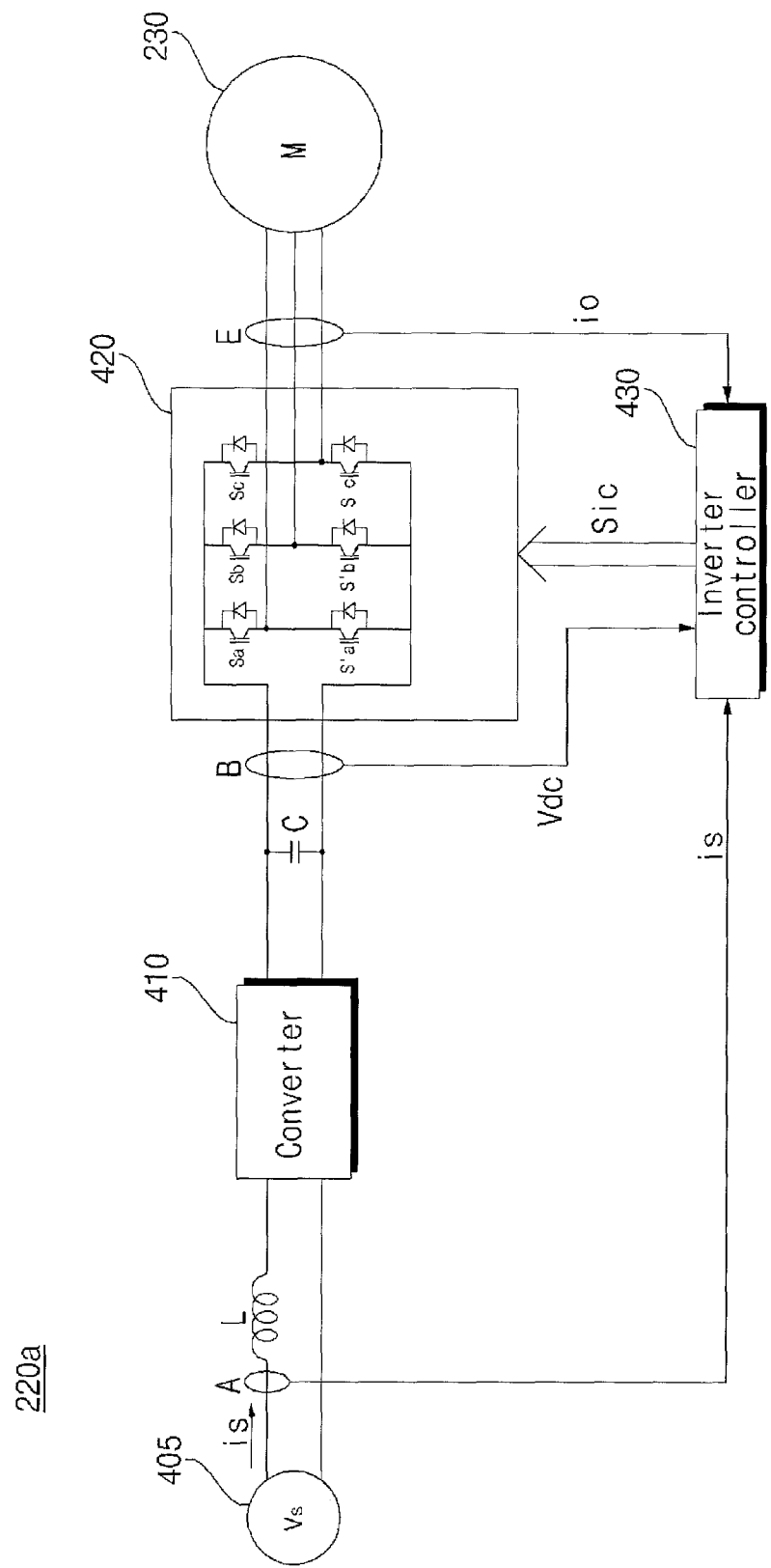
FIG. 5 is an exemplary internal circuit diagram of the motor drive unit of FIG. 4.

A detailed operation of the compressor motor drive unit 220a will be described in more detail with reference to FIG. 5. FIG. 5 is an exemplary internal circuit diagram of the compressor motor drive unit of FIG. 4. Referring to the drawing, the compressor motor drive unit 220a according to the exemplary embodiment of the present disclosure is for driving the motor in a sensorless manner, and may include an inverter 420 and an inverter controller 430.

Furthermore, the compressor motor drive unit 220a according to the exemplary embodiment of the present disclosure may include a converter 410, a dc terminal voltage detector B, a smoothing capacitor C, and an output current detector E. Also, the drive unit 220 may further include an input current detector A, a reactor L, etc.

If an error occurs during operation, the inverter controller 430 according to the exemplary embodiment of the present disclosure may perform control such that diagnostic data including information about the time of occurrence of the error and information about the operation and status at the time of occurrence of the error is stored in the memory 140 or memory 270.

The inverter controller 430 may perform control such that the operation information and the status information are temporarily stored in the memory 140 or memory 270 at intervals, and, if an error occurs, may perform control such that information about the final operation and final status, among the operation and status information temporarily stored at periodic intervals, is finally stored in the memory 140 or memory 270.

Meanwhile, if an error occurs, the inverter controller 430 may perform control such that information about the operation at the time of occurrence of the error is stored in the memory 140 or memory 270 and such that information about the operation or status after a predetermined time from the occurrence of the error is stored in the memory 140 or memory 270.

Preferably, the amount of data about the final operation and final status stored in the memory 140 or memory 270 is larger than the amount of data about the operation at the time of occurrence of the error or the amount of data about the operation or status after a predetermined time from the occurrence of the error.

The reactor L is provided between a commercial alternating current power source 450 (vs) and the converter 410, and performs power factor correction or boosting operation. Also, the reactor L may function to limit harmonic current caused by high-speed switching by the converter 410.

The input current detector A may detect an input current is input from the commercial alternating current power source 405. To this end, a CT (current transformer), a shunt resistor, etc. may be used as the input current detector A. The detected input current is a pulse type discrete signal, and may be input to the inverter controller 430.

The converter 410 converts the commercial alternating current power 405 that has passed through the reactor L into direct current power and outputs it. Although the commercial alternating current power 405 is illustrated as single-phase alternating current power, it may be three-phase alternating current power. The internal structure of the converter 410 differs according to the type of the commercial alternating current power source 405.

On the other hand, the converter 410 may include diodes without switching elements and perform rectification without switching operation. For example, four diodes may be used in a bridge for a single-phase alternating current power source, and six diodes may be used in a bridge for a three-phase alternating current power source. Alternatively, the converter 410 may be a half-bridge converter in which two switching elements and four diodes are connected. For a three-phase alternating current power source, six switching elements and six diodes may be used. If the converter 410 has switching elements, it may perform boosting operation, power factor correction, and direct current power conversion by the switching operation of the switching elements.

The smoothing capacitor C smooths input power and stores it. Although the drawing illustrates a single device as the smoothing capacitor C, multiple devices may be provided to ensure device stability. Also, although the drawing illustrates that the smoothing capacitor C is connected to the output terminal of the converter 410, the present disclosure is not limited to this and direct current power may be directly input to the smoothing capacitor C. For example, direct current power from a solar cell may be input to the smoothing capacitor C directly or by DC-to-DC conversion. The following description focuses on what is depicted in the drawing. Meanwhile, two ends of the smoothing capacitor C may be called dc terminals or dc link terminals since direct current power is stored there.

The dc terminal voltage detector B may detect a dc terminal voltage Vdc at two ends of the smoothing capacitor C. To this end, the dc terminal voltage detector B may include a resistive element, an amplifier, etc. The detected dc terminal voltage Vdc is a pulse type discrete signal, and may be input to the inverter controller 430.

The inverter 420 may have a plurality of inverter switching elements and convert direct current power Vdc smoothed by the on/off operation of the switching elements into three-phase alternating currents va, vb, and vc of a predetermined frequency and output them to a three-phase synchronous motor 230.

The inverter 420 has upper arm switching elements (or switching transistors) Sa, Sb, and Sc and lower arm switching element (or switching transistors) S'a, S'b, and S'c that are connected in series and form pairs, respectively—that is, a total of three pairs of upper and lower arm switching elements Sa & S'a, Sb & S'b, and Sc & S'c may be connected in parallel to one another. Diodes are connected in inverse parallel to the switching element Sa, S'a, Sb, S'b, Sc, and S'c.

The switching elements of the inverter 420 are turned on/off based on an inverter switching control signal Sic from the inverter controller 430. By this, three-phase alternating current power of a predetermined frequency is output to the three-phase synchronous motor 230.

The inverter controller 430 may control the switching operation of the inverter 420 in a sensorless manner. To this end, the inverter controller 430 may receive an output current io detected by the output current detector E.

The inverter controller 430 outputs the inverter switching control signal Sic to the inverter 420 to control the switching operation of the inverter 420. The inverter switching control signal Sic is a pulse width modulation (PWM) switching control signal, and is generated and output based on the output current io detected by the output current detector E. A detailed operation of the outputting of the inverter switching control signal Sic from the inverter controller 430 will be described later with reference to FIG. 5.

The output current detector E detects the output current io flowing between the inverter 420 and the three-phase motor 230. That is, the current flowing through the motor 230 is detected. The output current detector E may detect output currents ia, ib, and ic of all phases, or may detect output currents of two phases by using three-phase equilibrium. The output current detector E may be positioned between the inverter 420 and the motor 230, and may use a CT (current transformer), a shunt resistor, etc. for current detection.

In a case in which a plurality of shunt resistors are used, three shunt resistors may be located between the inverter 420 and the synchronous motor 230, or one end of the three shunt resistors may be respectively connected to the three lower arm switching elements S'a, S'b, and S'c of the inverter 420. Alternatively, two shunt resistors may be used by using three phase equilibrium. In a case in which one shunt resistor is used, the shunt resistor may be provided between the above-described capacitor C and the inverter 420.

The detected output current io, which is a pulse type discrete signal, may be input to the inverter controller 430. An inverter switching control signal Sic is generated based on the detected output current io. In the following description, the detected output current io may correspond to three phase output currents ia, ib, and ic.

The three-phase synchronous motor 230 may include a stator and a rotor. Alternating current power of each phase of a predetermined frequency is applied to the coils of the stator of each phase (a, b, and c phases) to rotate the rotor.

For example, the motor 230 may be a Surface-Mounted Permanent-Magnet Synchronous Motor (SMPMSM), Interior Permanent Magnet Synchronous Motor (IPMSM), or a Synchronous Reluctance Motor (SynRM). Among them, the SMPMSM and the IPMSM are permanent magnet synchronous motors (PMSM) each having a permanent magnet, whereas the SynRM is a motor having no permanent magnet.

Figure 6:
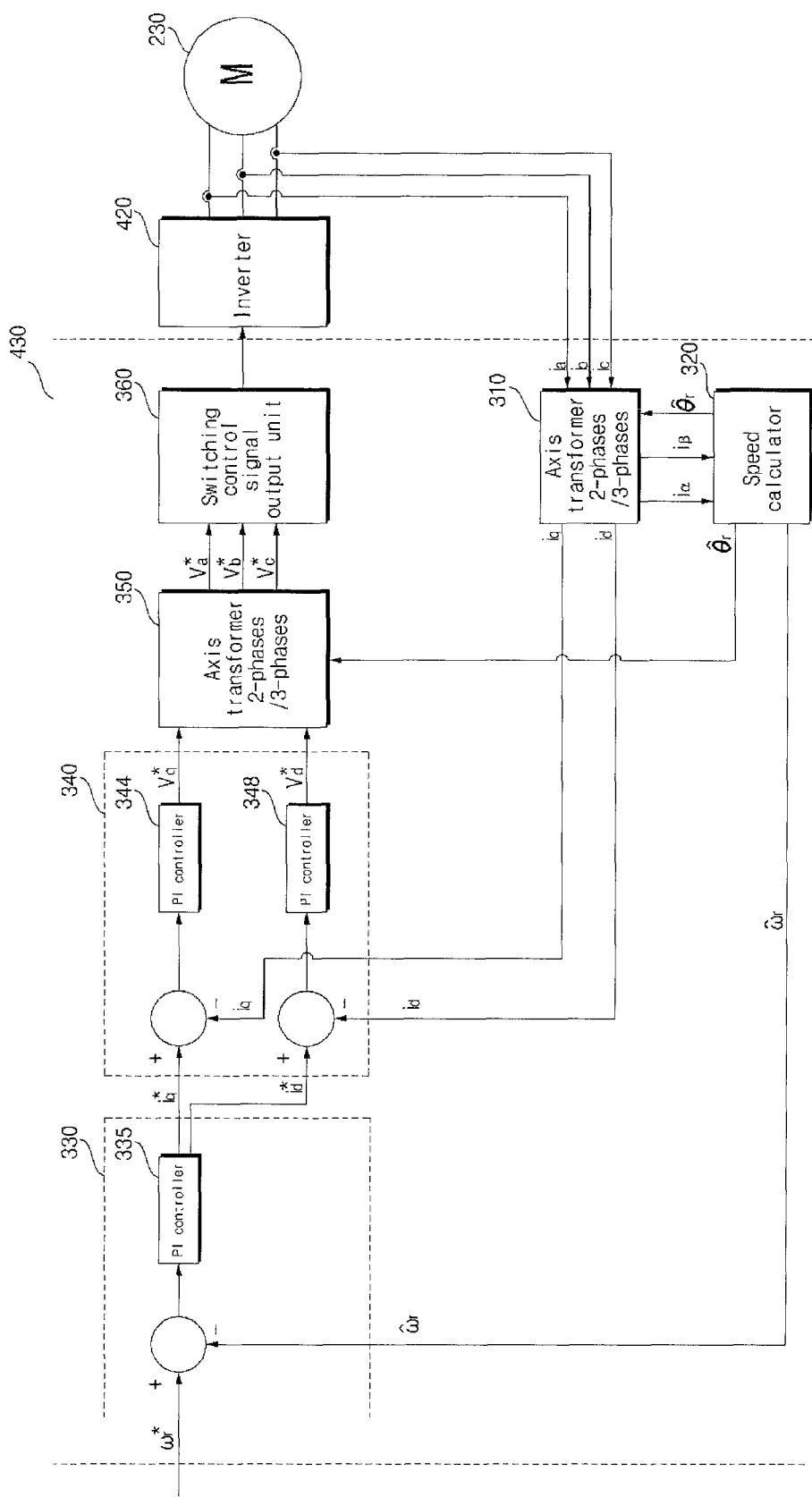
FIG. 6 is an internal block diagram of the inverter controller of FIG. 5.

FIG. 6 is an internal block diagram of the inverter controller of FIG. 5. Referring to FIG. 6, the inverter controller 430 may include an axis transformer 310, a speed calculator 320, a current command generator 330, a voltage command generator 340, an axis transformer 350, and a switching control signal output unit 360.

The axis transformer 310 may receive three-phase output currents ia, ib, and ic detected by the output current detector E and transform them into two-phase currents i$\alpha$ and i$\beta$ of a stationary coordinate system. Meanwhile, the axial transformer 310 may transform the two-phase current i$\alpha$ and i$\beta$ of the stationary coordinate system into two-phase currents id and iq of a rotating coordinate system.

The speed calculator 320 may output a calculated position $\hat{\theta}$, and a calculated speed, $\hat{\omega}$, based on the two-phase currents i$\alpha$ and i$\beta$ of the stationary coordinate system, obtained by the transformation by the axis transformer 310.

Meanwhile, the current command generator 330 generates a current command value $i^*_q$ based on the calculated speed, $\hat{\omega}$, and a speed command value $\omega^*_d$. For example, the current command generator 330 may perform PI control by a PI controller 335 and generate the current command value $i^*_q$ based on the difference between the calculated speed, $\hat{\omega}$, and the speed command value $\omega^*_q$. Although the figure illustrates a q-axis current command value $i^*_q$ as the current command value, a d-axis current command value $i^*_d$ as well may be generated unlike in the figure. Meanwhile, the d-axis current command value $i^*_d$ may be set to 0. Meanwhile, the current command generator 330 may further include a limiter (not shown) that limits the level of the current command value $i^*_q$ to keep it from going beyond a permissible range.

Next, the voltage command generator 340 generates d-axis and q-axis voltage command values $v^*_d$ and $v^*_q$ based on d-axis and q-axis currents $i_d$ and $i_q$, obtained by the axis transformation to a two-phase rotating coordinate system by the axis transformer, and the current command values $i^*_d$ and $i^*_q$ from the current command generator 330. For example, the voltage command generator 340 may perform PI control by a PI controller 344 and generate the q-axis voltage command value $v^*_q$, based on the difference between the q-axis current $i_q$ and the q-axis current command value $i^*_q$. Moreover, the voltage command generator 340 may perform PI control by a PI controller 348 and generate the d-axis voltage command value $v^*_d$, based on the difference between the d-axis current $i_d$ and the d-axis current command value $i^*_d$. Meanwhile, the voltage command generator 340 may further include a limiter (not shown) that limits the levels of the d-axis and q-axis voltage command values $v^*_d$ and $v^*_d$ to keep them from going beyond permissible ranges.

Meanwhile, the generated d-axis and q-axis voltage command values $v^*_d$ and $v^*_q$ are input into the axis transformer 350. The axis transformer 350 receives the position $\hat{\theta}$, calculated by the speed calculator 320 and the d-axis and q-axis voltage command values $v^*_d$ and $v^*_q$ and perform axis transformation.

First of all, the axis transformer 350 performs transformation from the two-phase rotating coordinate system to the two-phase stationary coordinate system. In this case, the position $\hat{\theta}$, calculated by the speed calculator 320 may be used.

Then, the axis transformer 350 performs transformation from the two-phase stationary coordinate system to a three-phase stationary coordinate system. By this transformation, the axis transformer 350 outputs three-phase output voltage command values $v^*a$, $v^*b$, and $v^*c$.

The switching control signal output unit 360 generates and outputs a pulse width modulation (PWM)-based inverter switching control signal Sic, based on the three-phase output voltage command values $v^*a$, $v^*b$, and $v^*c$.

The output inverter switching control signal Sic may be converted into a gate drive signal by a gate driver (not shown) and input into the gates of the switching elements in the inverter 420. By this, the switching elements Sa, S'a, Sb, S'b, Sc, and S'c in the inverter 420 perform switching operation.

Figure 7A:
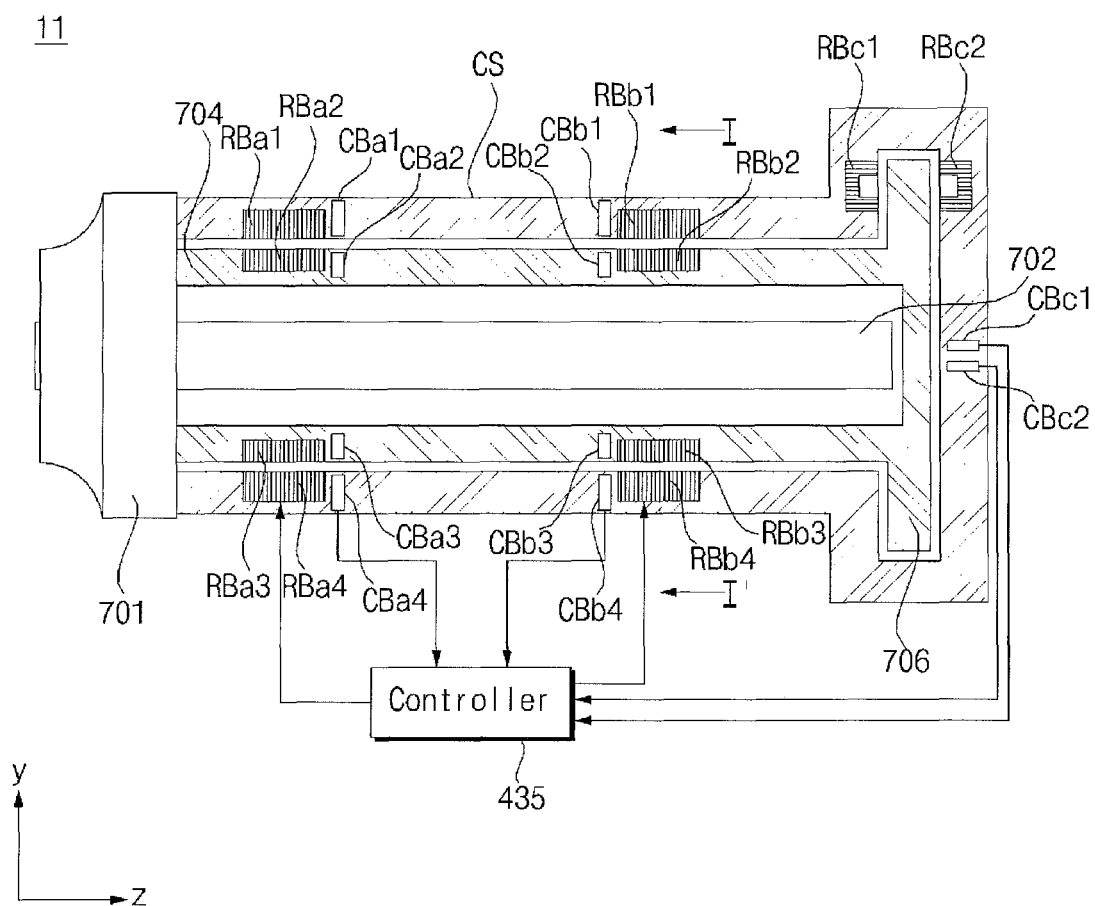
FIG. 7A is a diagram illustrating an example of the structure of the compressor of FIG. 4.

FIG. 7A is a diagram illustrating an example of the structure of the compressor of FIG. 4. Referring to the drawing, an impeller 701 and a rotor 702 may be provided within the compressor 11. The rotor 702 for the compressor motor may be connected to the impeller 701 provided at one side within the compressor 11. The rotor 702 extends along the z-axis, and a T-shaped thrust plate 706 may be formed near an end of the rotor 702.

A frame 704 is provided within a case CS of the compressor 11, and a plurality of magnetic bearings RBa1 to RBa4, RBb1 to RBb4, and RBc1 and RBc2 may be provided within the frame 704. The plurality of magnetic bearings RBa1 to RBa4, RBb1 to RBb4, and RBc1 and RBc2 may have a bobbin (not shown) and a bearing coil (not shown) wound around the bobbin.

When no current flows through the bearing coils of the plurality of magnetic bearings RBa1 to RBa4, RBb1 to RBb4, and RBc1 and RBc2, the surfaces of some of the magnetic bearings and the rotor 702 make contact. When a current flows through the bearing coils, the rotor 702 is magnetically levitated (or repulsed) from the surfaces of some of the magnetic bearings.

After being magnetically levitated, the rotor 702 of the compressor motor 230 rotates. That is, the rotating speed of the rotor 702 may be varied by the inverter controller 430 of FIGS. 4 to 6.

Among the plurality of magnetic bearings RBa1 to RBa4, RBb1 to RBb4, and RBc1 and RBc2, the magnetic bearings RBa1 to RBa4 and RBb1 to RBb4 are radial magnetic bearings, and may control the rotation of the rotor along the radius. That is, the x and y axes may be controlled.

Among the plurality of magnetic bearings RBa1 to RBa4, RBb1 to RBb4, and RBc1 and RBc2, the magnetic bearings RBa1 to RBa4 and RBb1 to RBb4 may be spaced apart from the rotor 702 extending along the z axis. Among the plurality of magnetic bearings RBa1 to RBa4, RBb1 to RBb4, and RBc1 and RBc2, the magnetic bearings RBc1 and RBc2 are axial magnetic bearings, and may control the rotation of the rotor along an axis. That is, the z axis may be controlled. Among the plurality of magnetic bearings RBa1 to RBa4, RBb1 to RBb4, and RBc1 and RBc2, the magnetic bearings RBc1 and RBc2 may be spaced apart from the thrust plate extending along the y axis.

Also, a plurality of gap sensors CBa1 to CBa4, CBb1 to CBb4, and CBc1 and CBc2 for sensing the gap between the magnetic bearings and the rotor 702 may be provided near the plurality of bearings RBa1 to RBa4, RBb1 to RBb4, and RBc1 and RBc2. Some CBc1 and CBc2 of the plurality of gap sensors CBa1 to CBa4, CBb1 to CBb4, and CBc1 and CBc2 are radial gap sensors, and may sense the position of the rotor along the x and y axes. Some CBc1 and CBc2 of the plurality of gap sensors CBa1 to CBa4, CBb1 to CBb4, and CBc1 and CBc2 are axial gap sensors, and may sense the position of the rotor along the z axis. The plurality of gap sensors CBa1 to CBa4, CBb1 to CBb4, and CBc1 and CBc2 may be implemented as hall sensors.

The bearing controller 435 may control the current applied to the plurality of magnetic bearings RBa1 to RBa4, RBb1 to RBb4, and RBc1 and RBc2, especially, the bearing coils of the RBa1 to RBa4, RBb1 to RBb4, and RBc1 and RBc2, based on gap information from the plurality of gap sensors CBa1 to CBa4, CBb1 to CBb4, and CBc1 and CBc2.

Figure 7B:
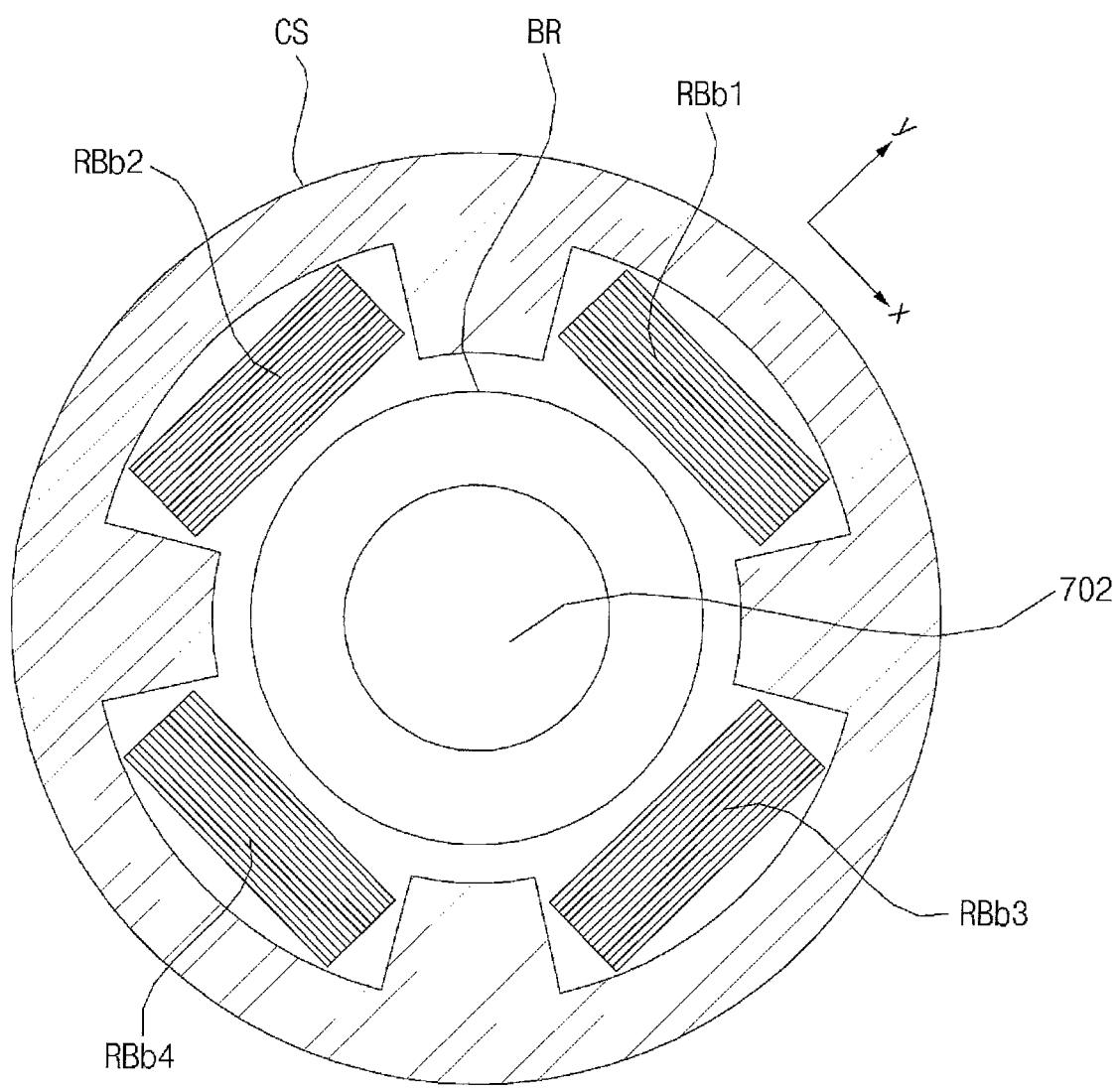
FIG. 7B is a cross-sectional view taken along the line I-I' of FIG. 7A.

FIG. 7B is a cross-sectional view taken along the line I-I' of FIG. 7A. Referring to the drawing, as can be seen in the cross-section taken along the line I-I' of FIG. 7A, the radial magnetic bearings RBb1 to RBb4 may be spaced apart from one another. Also, the figure illustrates that the rotor 702 is spaced apart from the inner surface BR of the radial magnetic bearings RBb1 to RBb4. The rotor 702 of FIG. 7B is shown to be levitated.

Figure 7C:
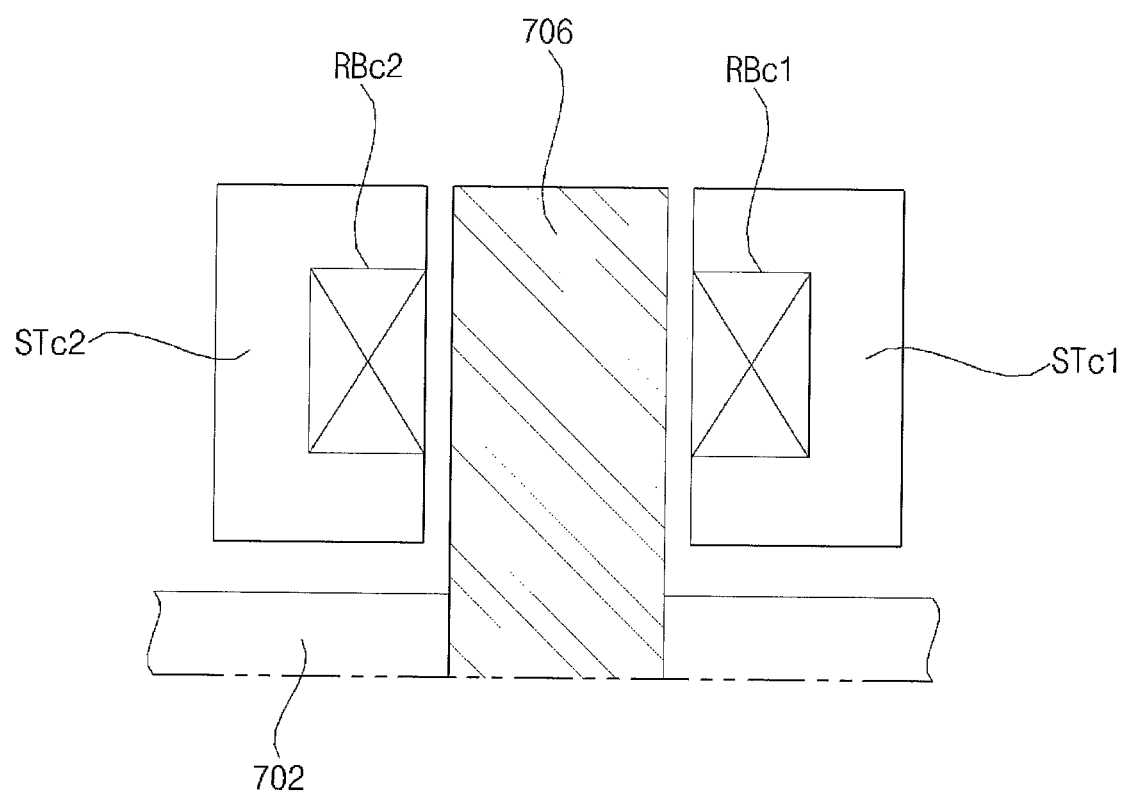
FIG. 7C is a side view of the compressor of FIG. 7A.

FIG. 7C is a side view of the compressor of FIG. 7A. Referring to the drawing, the axial magnetic bearing RBC1 and RBC2 may be provided on both sides of the thrust plate 706, near an end of the rotor 702. The rotor 702 may be provided at the bottom end of the thrust plate 706.

Figure 8B:
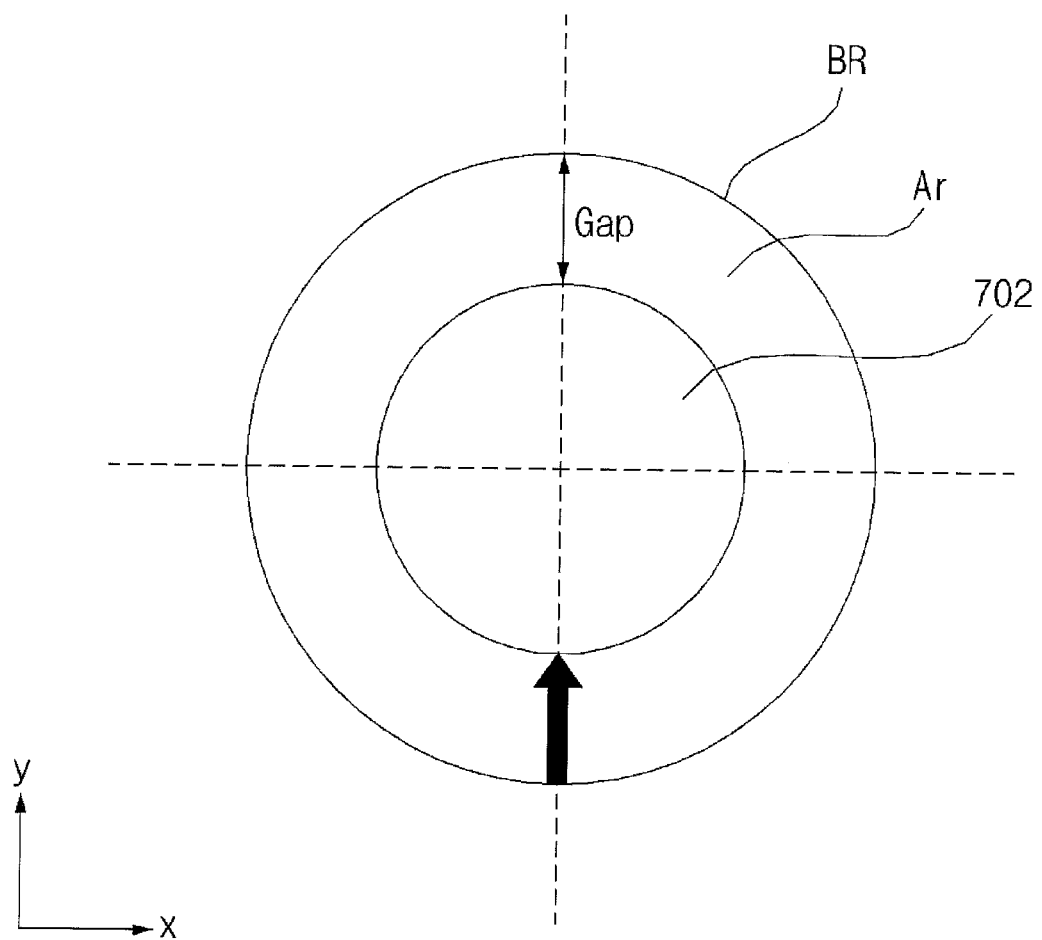
Figure 8C:
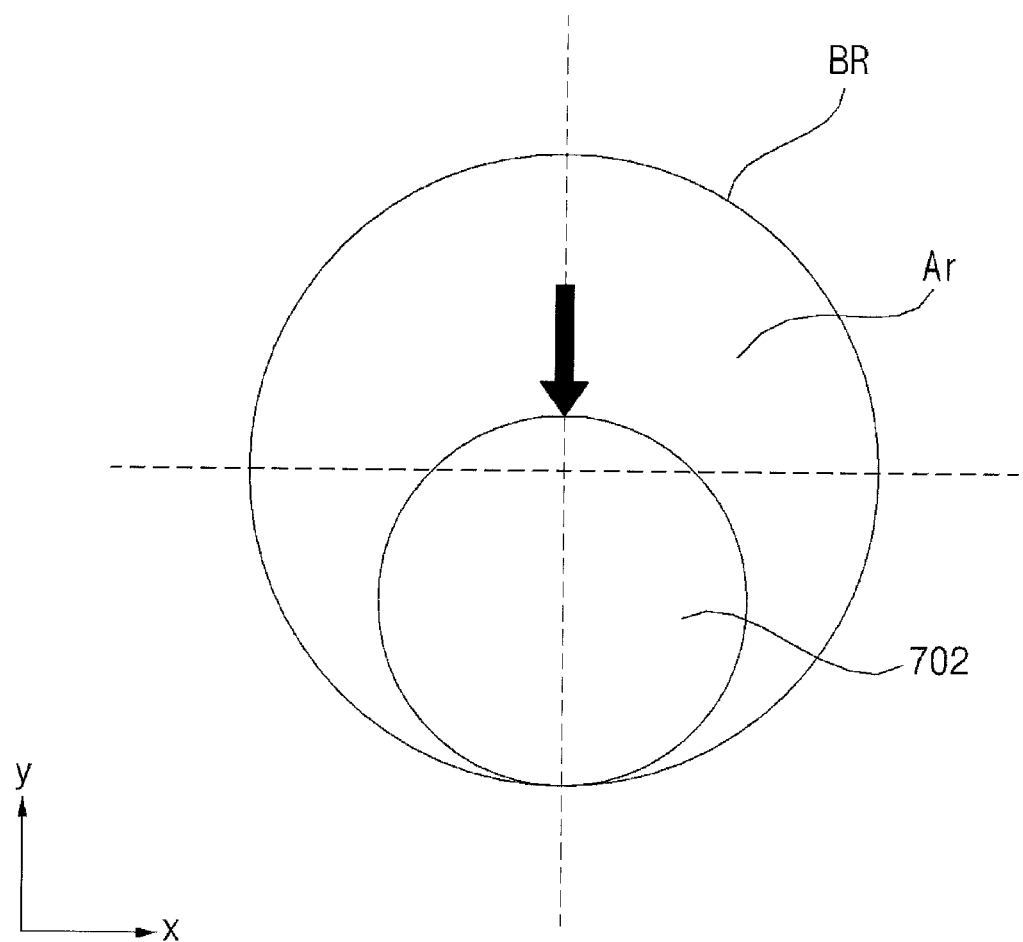

FIGS. 8A to 8C are views to be used as a reference to explain the levitation and landing of a rotor in a bearing. First of all, FIG. 8A illustrates that the rotor 702 makes contact with the inner surface BR of the radial magnetic bearings RBb1 to RBb4 as no current is applied to the bearing coils of the plurality of magnetic bearings RBa1 to RBa4, RBb1 to RBb4, and RBc1 and RBc2.

Next, FIG. 8B illustrates that the rotor 702 is levitated (or repulsed) from the inner surface BR of the radial magnetic bearings RBb1 to RBb4 as a current is applied to the bearing coils of the plurality of magnetic bearings RBa1 to RBa4, RBb1 to RBb4, and RBc1 and RBc2. The bearing controller 435 may perform control such that the gap between the inner surface BR of the radial magnetic bearings RBb1 to RBb4 and the rotor 702 is kept constant.

Next, FIG. 8C illustrates that the rotor 702 lands on the inner surface BR of the radial magnetic bearings RBb1 to RBb4 as no current is applied to the bearing coils of the plurality of magnetic bearings RBa1 to RBa4, RBb1 to RBb4, and RBc1 and RBc2. The inner surface BR of the radial magnetic bearings RBb1 to RBb4 shown in FIGS. 8A to 8C may be the inner surface of the frame 704 of FIG. 7A.

Figure 9A:
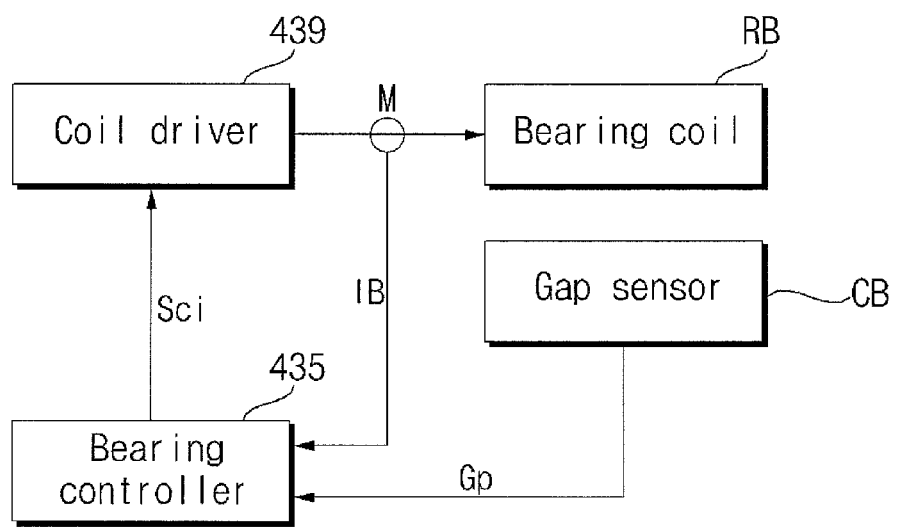
FIG. 9A is an exemplary internal block diagram of the bearing drive unit of FIG. 4.

FIG. 9A is an exemplary internal block diagram of the bearing drive unit 221 of FIG. 4. Referring to the drawing, the bearing drive unit 221a may include a bearing coil RB, a coil driver 439 for applying current to the bearing coil RB, a bearing coil current detector M for detecting the current applied to the bearing coil RB, a gap sensor CB for sensing the gap between the bearing coil RB and the rotor 702, and a bearing controller 435 that outputs a switching control signal Sci to the coil driver 439 based on gap information Gp from the gap sensor CB and a current IB from the bearing coil current detector M.

Figure 9B:
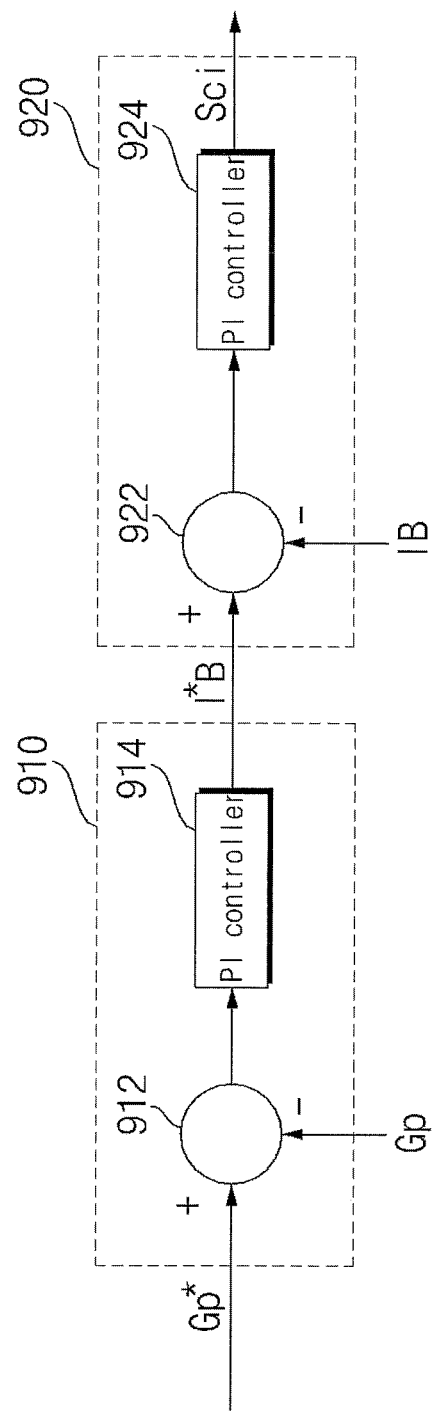
FIG. 9B is an exemplary internal block diagram of the bearing controller of FIG. 9A.

FIG. 9B is an exemplary internal block diagram of the bearing controller of FIG. 9A. Referring to the drawing, the bearing controller 435 may include a current command generator 910 and a duty command generator 920. The current command generator 910 generate a current command value I*B based on the gap information Gp from the gap sensor CB and a gap command value Gp*. For example, the current command generator 910 may perform PI control by a PI controller 914 and generate the current command value I*B, based on the difference between the gap information Gp and the gap command value Gp*. Meanwhile, the current command generator 910 may further include a limiter (not shown) that limits the level of the current command value I*B to keep it from going beyond a permissible range.

The duty command generator 920 generates a duty command value based on the current information IB from the bearing coil current detector M and the current command value I*B. For example, the duty command generator 920 may perform PI control by a PI controller 924 and generate a switching control signal Sci containing a duty command value, based on the difference between the current information IB and the current command value I*B.

Meanwhile, the duty command generator 920 may further include a limiter (not shown) that limits the level of the duty command value to keep it from going beyond a permissible range. For example, if the gap between a magnetic bearing and the rotor 702 is smaller than the gap command value Gp*, the bearing controller 435 may output a switching control signal Sci for increasing the duty in order to increase the gap.

In this case, the switching control signal Sci for increasing the duty may mean that the switching cycle is increased and the duty is increased within the increased switching cycle. Alternatively, the switching control signal Sci for increasing the duty may mean that the duty is increased within a certain switching cycle.

In another example, if the gap between a magnetic bearing and the rotor 702 is larger than the gap command value Gp*, the bearing controller 435 may output a switching control signal Sci for decreasing the duty in order to decrease the gap. By the above operation of the bearing controller 435, a constant gap may be maintained when the rotor rotates.

Also, the bearing controller 435 may output a switching control signal Sci for increasing the duty so that the gap between a magnetic bearing and the rotor 702 increases gradually when the rotor is levitated. Also, the bearing controller 435 may output a switching control signal Sci for decreasing the duty so that the gap between a magnetic bearing and the rotor 702 decreases gradually when the rotor lands.

Figure 10:
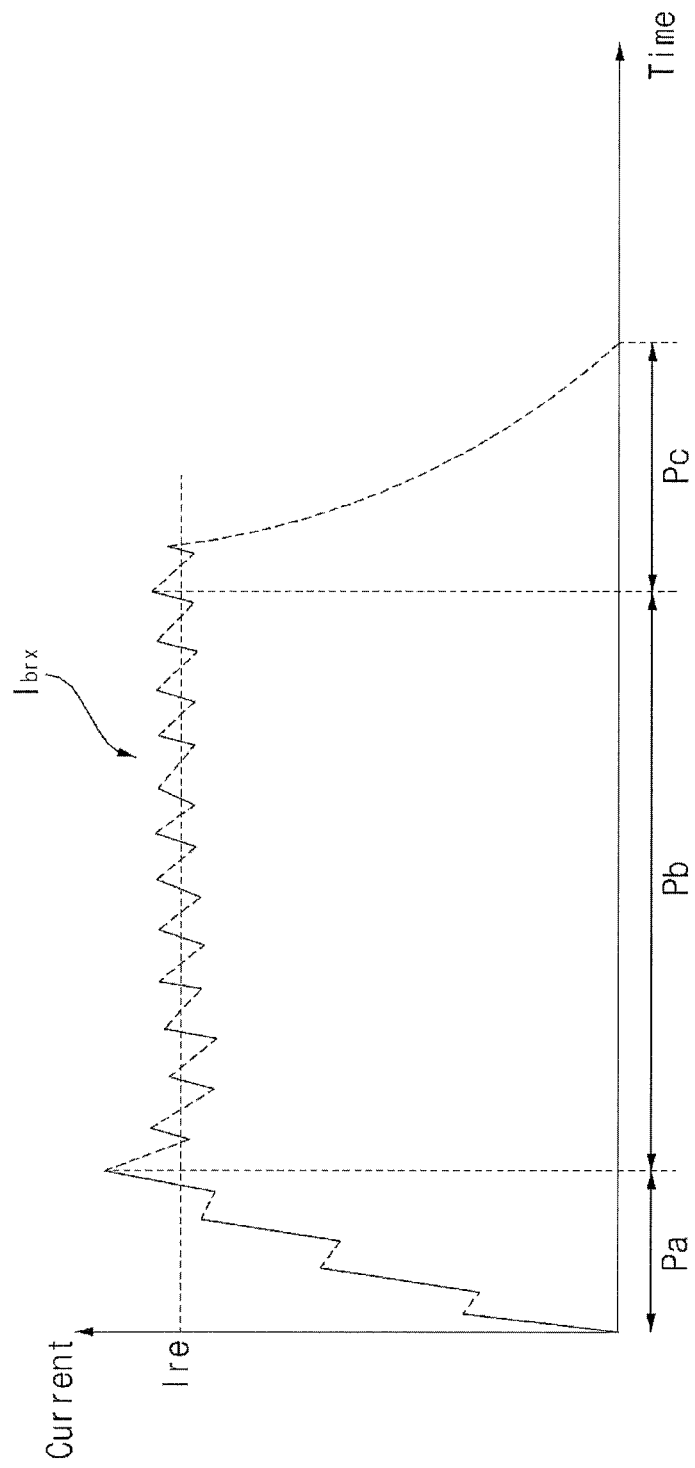
FIG. 10 is a view illustrating the waveform of a current applied to a bearing coil.

FIG. 10 is a view illustrating the waveform of a current applied to a bearing coil. Referring to the drawing, the current waveform Ibrx denotes the waveform of a current applied to a bearing coil. The Pa period denotes a rotor levitation period, the Pb period denotes a rotor rotation period after rotor levitation, and the Pc period denotes a rotor landing period. When the current applied to the bearing coil is cut off in the rotor landing period Pc, the current applied to the bearing coil drops rapidly, as shown in the drawing.

In this case, the rotor 702 being levitated lands as shown in FIG. 8C. Due to this rapid drop in current, physical friction occurs between the rotor 702 and the bearing BR. This can cause physical wear between the rotor 702 and the bearing BR, and furthermore can increase the likelihood of failure in the gap sensor. To resolve this problem, the present disclosure suggests a method of preventing damage to the rotor of the compressor motor when the compressor motor is stopped in a magnetic levitation system. This will be described with reference to FIG. 11 and the subsequent figures.

Figure 11:
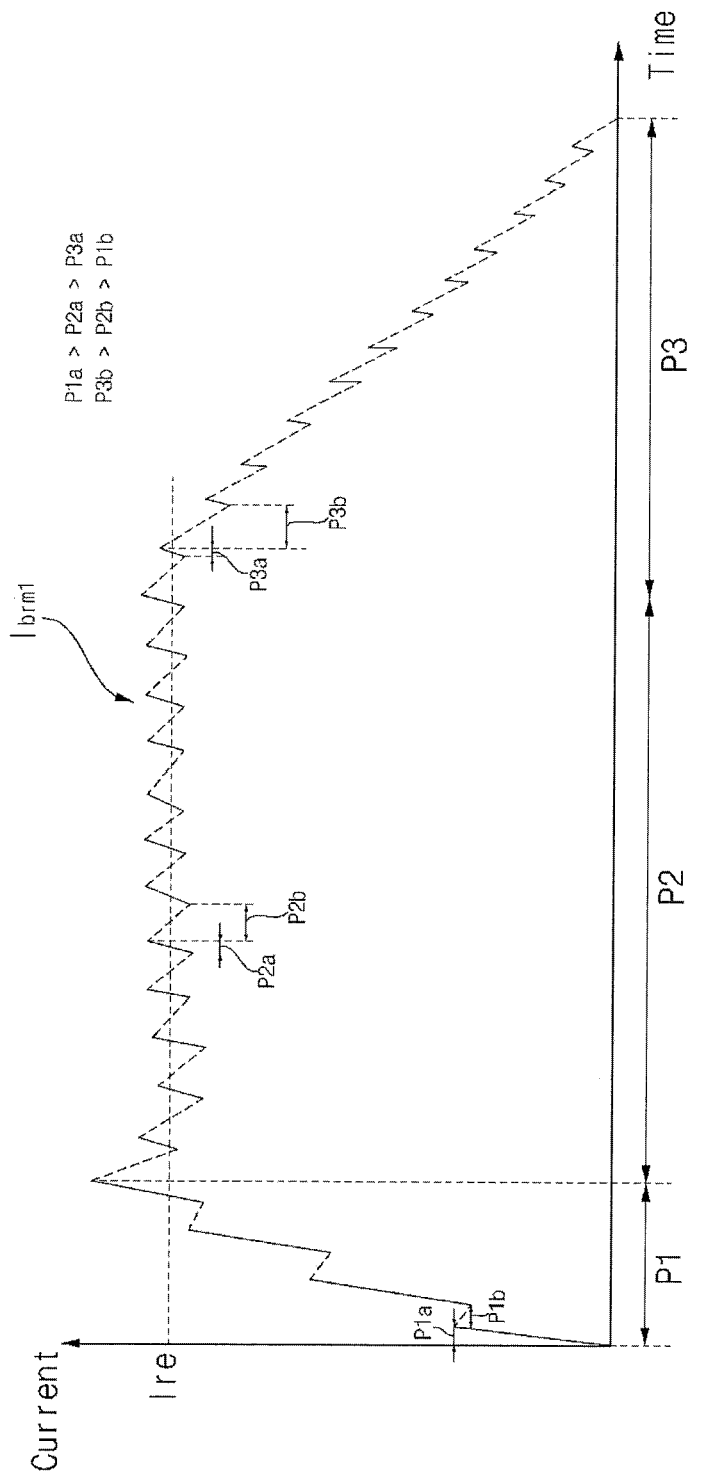
FIG. 11 is a view illustrating an example of the waveform of a current applied to a bearing coil according to an exemplary embodiment of the present disclosure.
Figure 12A:
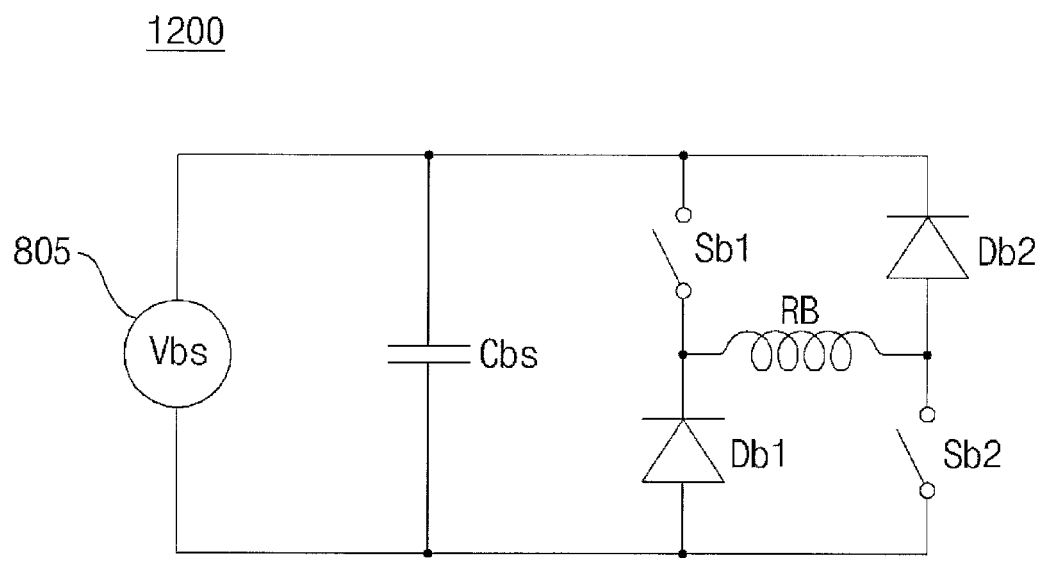
FIGS. 12A to 12C are circuit diagrams relating to the current waveform of FIG. 11.
Figure 12B:
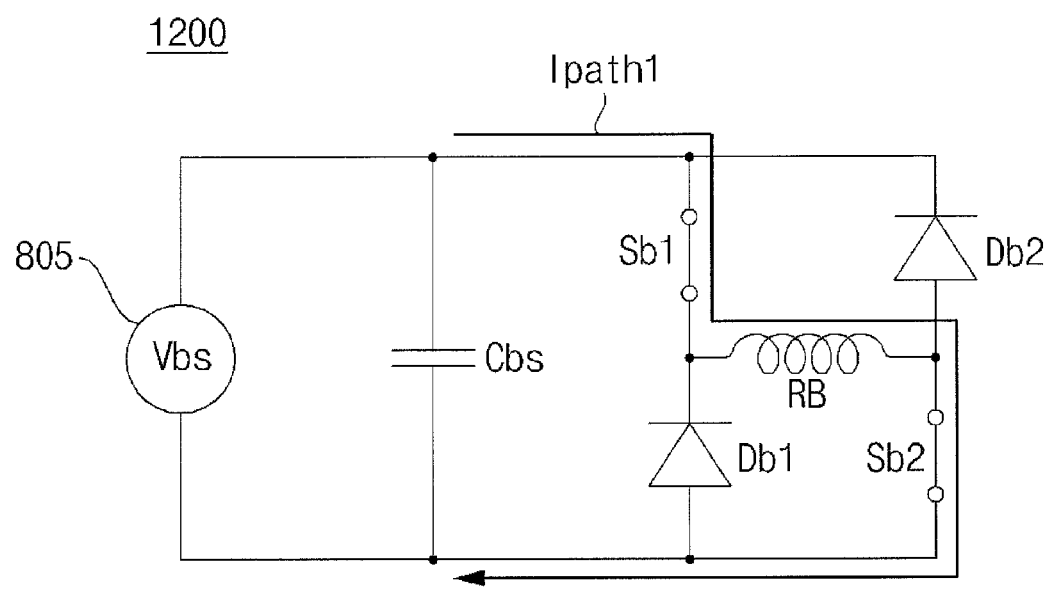
Figure 12C:
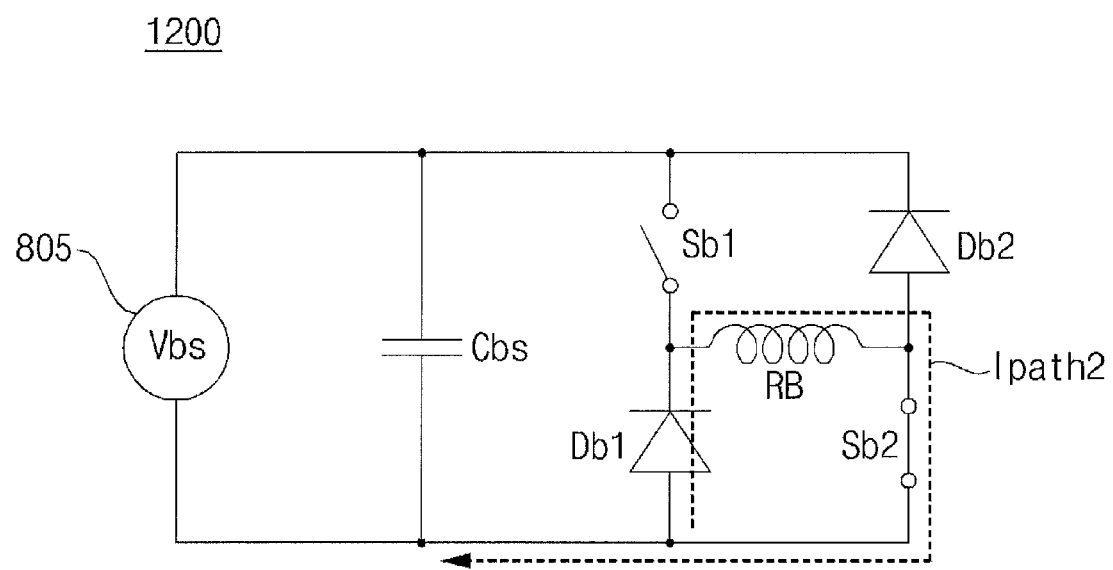

FIG. 11 is a view illustrating an example of the waveform of a current applied to a bearing coil according to an exemplary embodiment of the present disclosure. FIGS. 12A to 12C are circuit diagrams relating to the current waveform of FIG. 11. First of all, referring to FIG. 11, the current waveform Ibrm1 denotes an example of the waveform of a current applied to a bearing coil according to an exemplary embodiment of the present disclosure.

The P1 period denotes a rotor levitation period, the P2 period denotes a rotor rotation period after rotor levitation, and the P3 period denotes a rotor landing period. According to the exemplary embodiment of the present disclosure, the bearing controller 435 may perform control such that the current flowing through the bearing coil RB decreases gradually as shown in FIG. 11, during the rotor landing period P3 of the compressor motor 230.

In particular, when the rotor 702 of the compressor motor 230 lands, the bearing controller 435 may perform control such that first and second modes alternate with each other, the first mode being a mode in which the current stored in the bearing coil RB is discharged, and the second mode being a mode in which current flows through the bearing coil RB by power stored in a capacitor Cbs.

As can be seen from the drawings, during the rotor landing period P3, a first mode period P3b and a second mode period P3a alternate with each other, the first mode period P3b being a period in which the current stored in the bearing coil RB is discharged, and the second mode period P3a being a period in which current flows through the bearing coil RB.

Preferably, the first mode period P3b is longer than the second mode period P3a during the rotor landing period P3. Accordingly, the current flowing through the bearing coil RB may be controlled to decrease gradually. Accordingly, the rotor of the compressor motor can land softly when the compressor motor is stopped in a magnetic levitation system, and therefore damage to the rotor of the motor compressor can be prevented. Besides, damage to the magnetic bearings, gap sensors, etc. can be prevented. Furthermore, the stability and reliability of the compressor driving apparatus (or compressor driver) 220 and the chiller 100 including the same are improved. FIG. 11 illustrates that the first mode period P3b and the second mode period P3a are all constant during the rotor landing period P3, but the present disclosure is not limited to this.

Also, when the rotor 702 of the compressor motor 230 is levitated, the bearing controller 435 may perform control such that the second mode and the first mode alternate with each other. A first period for the first mode and a second period for the second mode, during the landing of the rotor 702 of the compressor motor 230, are respectively shorter than a third period for the first mode and a fourth period for the second mode, during the levitation of the rotor 702 of the compressor motor 230.

As can be seen from the drawings, during the rotor levitation period P1, a second mode period P1a and a first mode period P1b alternate with each other, the second mode period P1a being a period in which current flows through the bearing coil RB, and the first mode period P1b being a period in which the current stored in the bearing coil RB is discharged.

In particular, it is preferable that the second mode period P1a is longer than the first mode period P1b during the rotor levitation period P1. Accordingly, the current flowing through the bearing coil RB may be controlled to gradually rise.

For rapid levitation and soft landing, as shown in the drawing, the second mode period P3a of the rotor landing period P3 is preferably shorter than the second mode period P1a of the rotor levitation period P1. For rapid levitation and soft landing, as shown in the drawing, the first mode period P3b of the rotor landing period P3 is preferably shorter than the first mode period P1b of the rotor levitation period P1. Accordingly, the rotor of the compressor motor can land softly and stably when the compressor motor is stopped in a magnetic levitation system.

When the compressor motor 230 is levitated and rotates, the bearing controller 435 may perform control such that the first mode and the second mode alternate with each other. A first period for the first mode and a second period for the second mode, during the landing of the rotor 702 of the compressor motor 230, are respectively longer than a fifth period for the first mode and a sixth period for the second mode, during the rotation of the compressor motor 230. Accordingly, the rotor of the compressor motor can land softly and stably when the compressor motor is stopped in a magnetic levitation system.

As can be seen from the drawings, during the rotor rotation period P2, a second mode period P2a and a first mode period P2b alternate with each other, the second mode period P2a being a period in which current flows through the bearing coil RB, and the first mode period P2b being a period in which the current stored in the bearing coil RB is discharged.

In particular, the second mode period P2a and the first mode period P2b may be almost equal in length during the rotor levitation period P1. Accordingly, the current flowing through the bearing coil RB may be controlled to maintain a constant level. As a consequence, a constant gap may be maintained between the rotor 702 and the magnetic bearing.

For soft landing, as shown in the drawing, the second mode period P3a of the rotor landing period P3 is preferably longer than the second mode period P2a of the rotor rotation period P2. For soft landing, as shown in the drawing, the first mode period P3b of the rotor landing period P3 is preferably longer than the first mode period P1b of the rotor levitation period P1. Accordingly, the rotor of the compressor motor can land softly and stably when the compressor motor is stopped in a magnetic levitation system.

Since the second mode period P2a of the rotor rotation period P2 is shorter than the first mode period P3b of the rotor landing period P3, a constant gap may be stably maintained between the rotor 702 and the magnetic bearing. Since the first mode period P2b of the rotor rotation period P2 is shorter than the first mode period P3b of the rotor landing period P3, a constant gap may be stably maintained between the rotor 702 and the magnetic bearing.

Meanwhile, referring to FIG. 12A, the coil driver 1200 may include a capacitor Cbs storing direct current power Vbs, a first switching element Sb1 and a first diode element Db1 that are connected between two ends of the capacitor Cbs, and a second diode element Db2 and a second switching element Sb2 that are connected between the two ends of the capacitor Cb2 and connected in parallel with the first switching element Sb1 and the first diode element Db1.

The bearing coil RB may be connected between the first switching element Sb1 and the first diode element Db1 and between the second diode element Db2 and the second switching element Sb2. That is, direct current power Vbs from a direct current power supply 805 may be stored in the capacitor Cbs, and the first switching element Sb1 may be connected between one end of the capacitor Cbs and one end of the bearing coil RB.

The first diode element Db1 may be connected between the other end of the capacitor Cbs and one end of the bearing coil RB. The second diode element Db2 may be connected between one end of the capacitor Cbs and the other end of the bearing coil RB. The second switching element Sb2 may be connected between the other end of the capacitor Cbs and the other end of the bearing coil RB.

The bearing controller 435 may turn on the first switching element Sb1 and the second switching element Sb2 simultaneously, as shown in FIG. 12B, so as to execute the second mode in which current flows through the bearing coil RB by power stored in the capacitor Cbs. Such a second mode may be called a magnetization mode. By this, energy may be accumulated in the bearing coil RB.

FIG. 12B illustrates a first current path Ipath1 in which current flows sequentially along the capacitor Cbs, first switching element Sb1, bearing coil RB, and second switching element Sb2 as the first switching element Sb1 and the second switching element Sb2 are simultaneously turned on.

On the other hand, the bearing controller 435 may turn on either the first switching element Sb1 or the second switching element Sb2, as shown in FIG. 12C, so as to execute the first mode in which the current stored in the bearing coil RB is discharged. The figure illustrates that the first switching element Sb1 is turned off and the second switching element Sb2 is turned on. Such a first mode may be called a freewheeling mode. By this, the energy accumulated in the bearing coil RB may be discharged.

FIG. 12C illustrates a second current path Ipath2 in which current flows sequentially along the first switching element Sb2, bearing coil RB, and first diode element Db1 as the second switching element Sb2 is turned on. The first mode is executed by means of the second current path Ipath2 of FIG. 12C, whereby the current flowing through the bearing coil RB declines, and the second mode is executed by means of the first current path Ipath1 of FIG. 12B, whereby the current flowing through the bearing coil RB rises.

The solid line regions on the current waveform Ibrm1 of FIG. 11 represent regions in which the second mode is executed as shown in FIG. 12B, and the dotted line regions represent regions in which the first mode is executed as shown in FIG. 12C. A description of how the rotor 702 of the compressor motor 230 operates when it is levitated, rotates, and lands will be described below again with reference to FIGS. 12B and 12C.

When the rotor 702 of the compressor motor 230 lands, the bearing controller 435 may perform control such that a first mode for turning on either the first switching element Sb1 or the second switching element Sb2 and a second mode for turning on both the first switching element Sb1 and the second switching element Sb2 by the power stored in the capacitor Cbs alternate with each other during the P3 period.

Also, when the rotor 702 of the compressor motor 230 is levitated, the bearing controller 435 may perform control such that the second mode and the first mode alternate with each other during the P1 period. It is preferable that a first period for turning on either the first switching element Sb1 or the second switching element Sb2 and a second period for turning on both the first switching element Sb1 and the second switching element Sb2, during the landing of the rotor 702 of the compressor motor 230, are respectively shorter than a third period for the first mode and a fourth period for turning on both the first switching element Sb1 and the second switching element Sb2, during the levitation of the rotor 702 of the compressor motor 230.

Also, when the compressor motor 230 is levitated and rotates, the first mode and the second mode alternate with each other, and it is preferable that a first period for turning on either the first switching element Sb1 or the second switching element Sb2 and a second period for turning on both the first switching element Sb1 and the second switching element Sb2, during the landing of the rotor 702 of the compressor motor 230, are respectively longer than a fifth period for turning on either the first switching element Sb1 or the second switching element Sb2 and a sixth period for turning on both the first switching element Sb1 and the second switching element Sb2, during the rotation of the compressor motor 230.

Figure 13A:
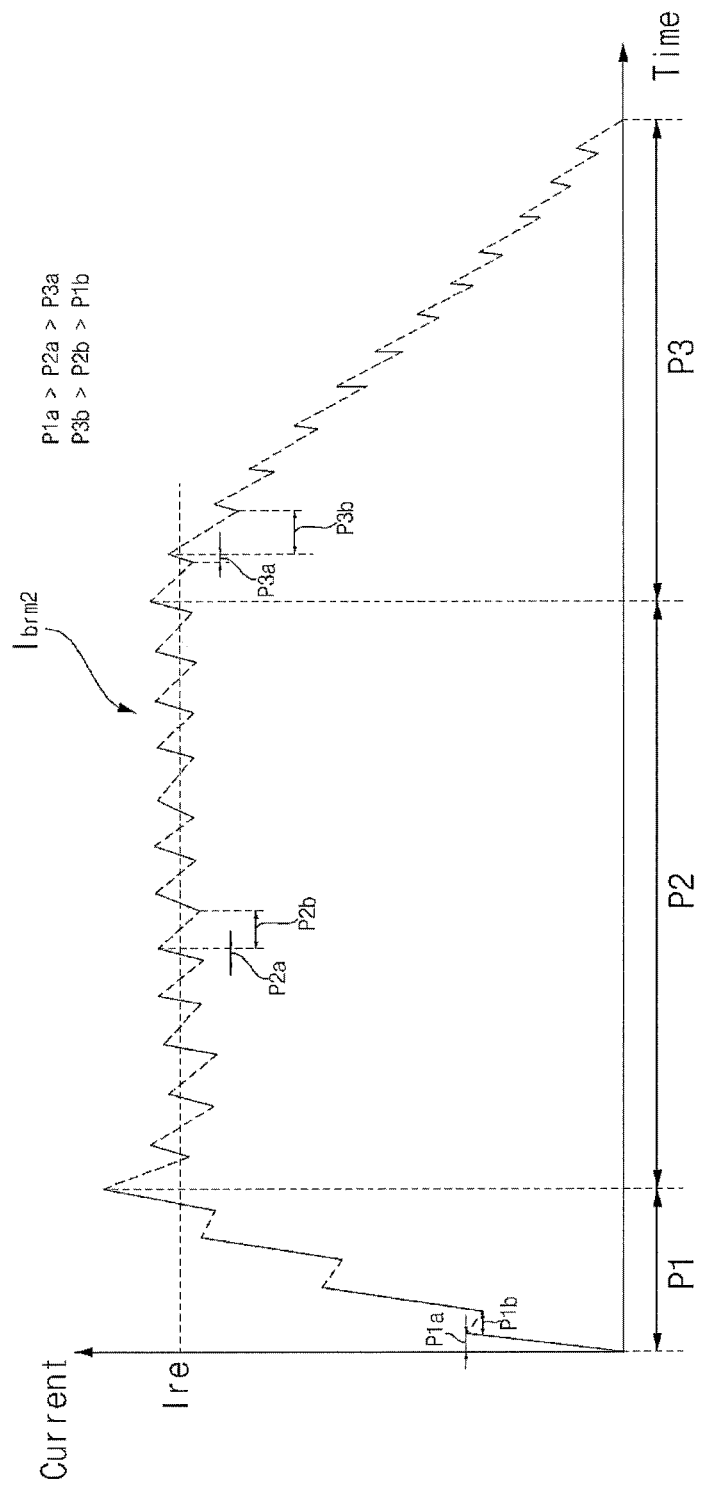
FIGS. 13A to 13C are views illustrating various examples of the waveform of a current applied to a bearing coil according to an exemplary embodiment of the present disclosure.
Figure 13B:
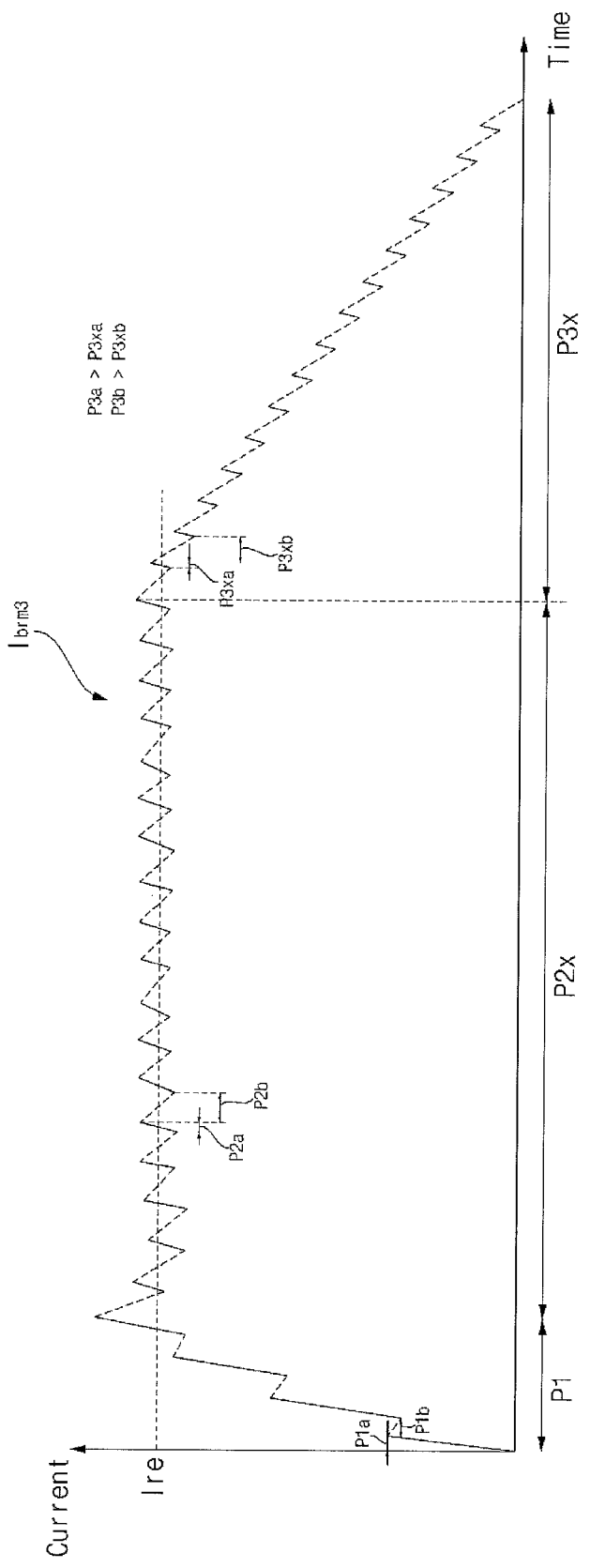
Figure 13C:
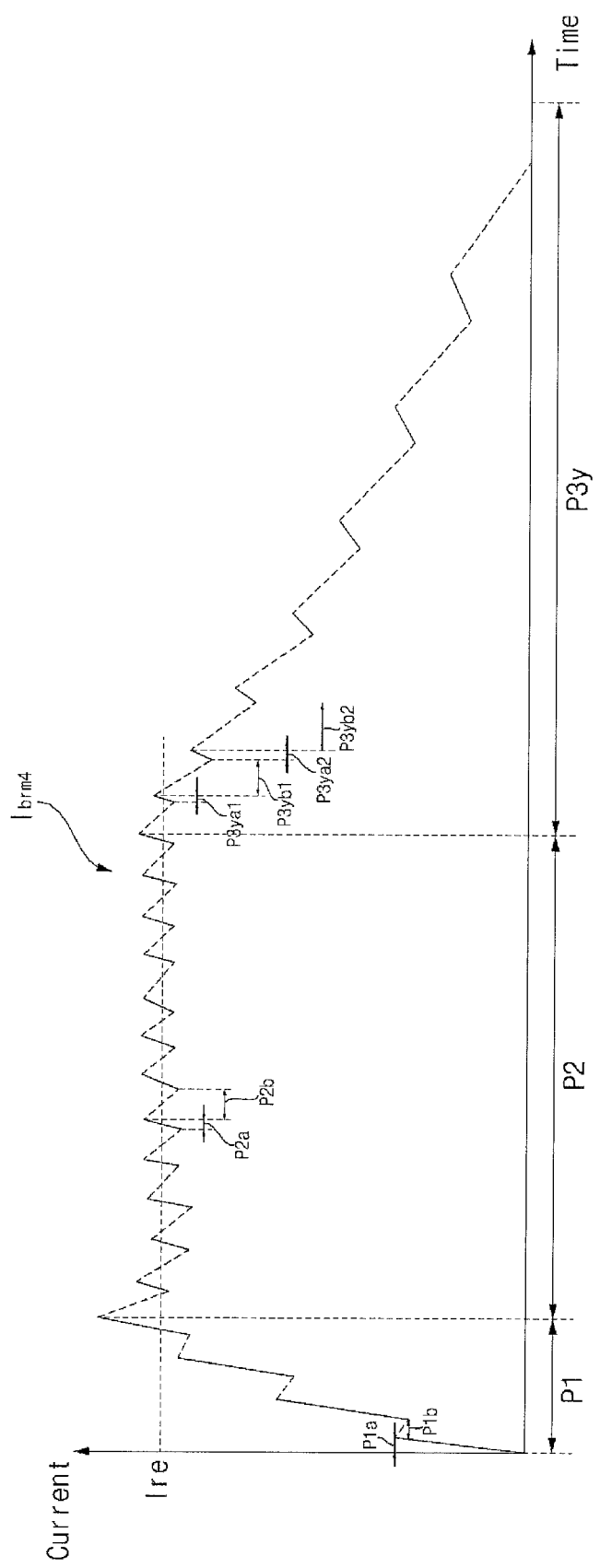

FIGS. 13A to 13C are views illustrating various examples of the waveform of a current applied to a bearing coil according to an exemplary embodiment of the present disclosure. First of all, referring to FIG. 13A, the current waveform Ibrm2 is a current waveform similar to that of FIG. 11, which shows a gradual decline in the current flowing through the bearing coil RB.

As can be seen from the drawings, during the rotor landing period P3, a first mode period P3b and a second mode period P3 alternate with each other, the first mode period P3b being a period in which the current stored in the bearing coil RB is discharged, and the second mode period P3a being a period in which current flows through the bearing coil RB.

FIG. 13A illustrates that the first mode period P3b and the second mode period P3a are all constant during the rotor landing period P3. Next, referring to FIG. 13B, the current waveform Ibrm3 has a longer rotor rotation period P2x, compared to FIG. 13A.

The bearing controller 435 may perform control such that, as the levitation and rotation period of the compressor motor increases 230, the landing period of the rotor 702 of the compressor motor 230 decreases. That is, the bearing controller 435 may perform control such that, as the levitation and rotation period of the compressor motor increases 230, a first period for turning on either the first switching element Sb1 or the second switching element Sb2 and a second period for turning on both the first switching element Sb1 and the second switching element Sb2 decreases, during the landing of the rotor 702 of the compressor motor 230. Also, the bearing controller 435 may perform control such that, as the levitation and rotation period of the compressor motor increases 230, a first period for the second mode and a second period for the second mode decreases, during the landing of the rotor 702 of the compressor motor 230.

Referring to FIG. 13B, the rotor rotation period P2x is longer compared to FIG. 13A. Thus, in order to improve the stability of soft landing, it is preferable that a period P3xb for the first mode and a period P3xa for the second mode are respectively shorter than the period P3b for the first mode and the period P3a for the second mode which are shown in FIG. 13A. By this, the landing period P3x of FIG. 13b becomes longer than that of FIG. 13A, thereby achieving more stable soft landing.

Next, referring to FIG. 13C, the current waveform Ibrm4 has a longer rotor landing period P3y, compared to FIG. 13A. When the rotor 702 of the compressor motor 230 lands, the bearing controller 435 may perform control such that a first period for the first mode and a second period for the second mode increase sequentially.

That is, when the rotor 702 of the compressor motor 230 lands, the bearing controller 435 may perform control such that a first period for turning on either the first switching element Sb1 or the second switching element Sb2 and a second period for turning on both the first switching element Sb1 and the second switching element Sb2 increase sequentially.

As the first mode period and the second mode period increase sequentially during the rotor landing period P3, the rotor lands slowly and completes the landing at a certain point in time. Usually, the current flowing through the bearing coil RB at an initial stage of the landing has a considerable effect on the landing. Thus, it is preferable that the current flowing through the bearing coil RB decreases at a slow rate at the initial stage of the landing and then gradually decreases at an increasingly rapid rate. Accordingly, as can be seen from the drawing, P3yb2 is longer than P3yb1 during the first mode period, and P3ya2 is longer than P3ya1 during the second mode period.

Figure 14:
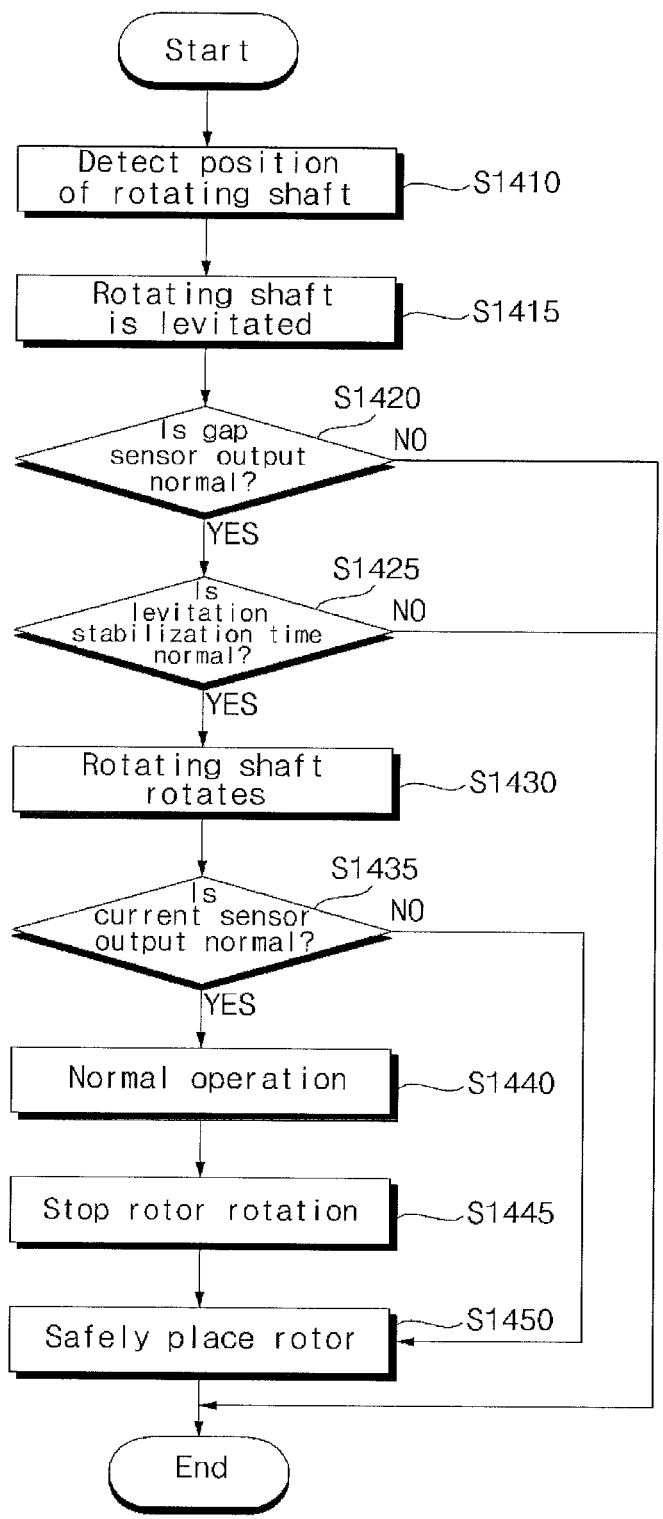
FIG. 14 is a flowchart of an operation method of a chiller according to an exemplary embodiment of the present disclosure.

FIG. 14 is a flowchart of an operation method of a chiller according to an exemplary embodiment of the present disclosure. Referring to the drawing, the bearing controller 435 senses the position of a rotating shaft based on gap information from a gap sensor CB (S1410).

Next, the bearing controller 435 controls the rotating shaft to be levitated (S1415). For example, the bearing controller 435 may perform control such that both the first switching element S1 and the second switching element S2 are turned on as shown in FIG. 12B, and then either the first switching element S1 or the second switching element S2 is turned on as shown in FIG. 12C.

In this case, the bearing controller 435 may perform control such that the period for FIG. 12B is longer than the period for FIG. 12C. In this case, the bearing controller 435 may receive gap information from the gap sensor CB and determine which of the plurality of bearing coils to apply more current to according to the received gap information. For example, the less gap based on the received gap information, the more current applied to the corresponding bearing coil.

Meanwhile, the bearing controller 435 may determine whether gap sensor output during the levitation of the rotor is normal or not (S1420). If normal, the next step is performed, and if not, a gap sensor replacement message may be output. Whether the gap sensor output is normal or not may be determined by comparison with a reference value.

Next, the bearing controller 435 may determine whether the rotor levitation stabilization time is normal or not after completion of the rotor levitation (S1425). If normal, the next step is performed, and if not, the rotor may be levitated again. Whether the gap sensor output is normal or not may be determined by comparison with a reference value.

Next, the inverter controller 430 within the compressor motor drive unit may perform control such that the rotor rotates after completion of the rotor levitation (S1430). In this case, the bearing controller 435 may perform control such that FIG. 12B or FIG. 12C is executed in such a way that the rotor maintains a constant gap.

The bearing controller 435 may determine whether the current IB from the bearing coil current detector M is constant or not (S1435). If normal, the bearing controller 435 may perform control to ensure normal operation (S1440). If not, a bearing coil current detector (M) replacement message may be output. Whether the current IB is normal or not may be determined by comparison with a reference value.

Next, when the rotor's rotation is stopped, the inverter controller 420 within the compressor motor driver may turn off all the switching elements of the inverter 420 (S1445). As such, for soft landing, the bearing controller 435 may employ any of the techniques of FIGS. 11 to 13C to have the rotor 702 placed safely (S1450). Accordingly, the stability of the compressor driving apparatus and the chiller including the same can be improved.

As is apparent from the above description, in accordance with the embodiments of the present disclosure, a compressor driving apparatus and a chiller including the same comprises a compressor including a compressor motor and a magnetic bearing; a coil driver including a switching element and to apply a current to a bearing coil of the magnetic bearing by a switching operation of the switching element to cause a rotor of the compressor motor to be levitated from or land on the magnetic bearing; and a controller to control the switching element of the coil driver, wherein, when the rotor of the compressor motor lands, the controller is configured to gradually decrease the current flowing through the bearing coil. Thereby, damage to the rotor of the compressor motor can be prevented when the compressor motor is stopped in a magnetic levitation system.

In particular, when the rotor of the compressor motor lands, the controller is configured to alternate first and second modes with each other, the first mode being a mode in which the current stored in the bearing coil is discharged, and the second mode being a mode in which current flows through the bearing coil by power stored in a capacitor. Thus, the rotor of the compressor motor can land softly when the compressor motor is stopped in a magnetic levitation system, and therefore damage to the rotor of the motor compressor can be prevented. Besides, damage to the magnetic bearing can be prevented. Accordingly, the stability and reliability of the compressor driving apparatus and the chiller including the same are improved.

Moreover, a first period for the first mode and a second period for the second mode, during the landing of the rotor of the compressor motor, are respectively shorter than a third period for the first mode and a fourth period for the second mode, during the levitation of the rotor of the compressor motor, thereby making the lading period of the rotor of the compressor motor longer than the levitation period of the rotor of the compressor motor. Accordingly, the rotor of the compressor motor can land softly and stably when the compressor motor is stopped in a magnetic levitation system.

In addition, as the levitation and rotation period of the compressor motor increases, a first period for the second mode and a second period for the second mode decreases, during the landing of the rotor of the compressor motor, thereby making the landing period of the rotor of the compressor motor. Accordingly, the rotor of the compressor motor can land softly and stably when the compressor motor is stopped in a magnetic levitation system.

Furthermore, when the rotor of the compressor motor lands, the first period for the first mode and the second period for the second mode increase sequentially. Accordingly, the rotor of the compressor motor can land softly and stably when the compressor motor is stopped in a magnetic levitation system.

A compressor driving apparatus and a chiller including the same according another exemplary embodiment of the present disclosure can prevent damage to the rotor of a compressor motor when the compressor motor is stopped in a magnetic levitation system, by including: a compressor including a compressor motor and a magnetic bearing; a coil driver including a switching element and to apply a current to a bearing coil of the magnetic bearing by a switching operation of the switching element to cause a rotor of the compressor motor to be levitated from or land on the magnetic bearing; and a controller to control the switching element of the coil driver, wherein, when the rotor of the compressor motor lands, the controller is configured to alternate a first mode and a second mode with each other, the first mode being a mode in which the current stored in the bearing coil is discharged, and the second mode being a mode in which current flows through the bearing coil by power stored in a capacitor.

A compressor driving apparatus and a chiller including the same according to an exemplary embodiment of the present disclosure are not limited to the configurations and methods of the above-described exemplary embodiments, but all or some of the exemplary embodiments may be selectively combined to make various modifications.

Meanwhile, operation methods of a compressor driving apparatus and a chiller including the same according to the present disclosure may be implemented in the form of processor-readable program codes in a recording medium that may be read by a processor installed in the air conditioner. The processor-readable recording medium includes all kinds of recording devices storing data that may be read by the processor.

While the exemplary embodiments of the present disclosure have been illustrated and described above, the present disclosure is not limited to the aforementioned specific exemplary embodiments, various modifications may be made by a person with ordinary skill in the art to which the present disclosure pertains without departing from the subject matters of the present disclosure that are claimed in the claims, and these modifications should not be appreciated individually from the technical spirit or prospect of the present disclosure.

The present disclosure provides a compressor driving apparatus that can prevent damage to the rotor of a compressor motor when the compressor motor is stopped in a magnetic levitation system, and a chiller including the same. The present disclosure also provides a compressor driving apparatus that allows for a soft landing for the rotor of a compressor motor when the compressor motor is stopped in a magnetic levitation system, and a chiller including the same.

An exemplary embodiment of the present disclosure provides a compressor driving apparatus including: a compressor including a compressor motor and a magnetic bearing; a coil driver including a switching element and to apply a current to a bearing coil of the magnetic bearing by a switching operation of the switching element to cause a rotor of the compressor motor to be levitated from or land on the magnetic bearing; and a controller to control the switching element of the coil driver, wherein, when the rotor of the compressor motor lands, the controller is configured to gradually decrease the current flowing through the bearing coil.

Another exemplary embodiment of the present disclosure provides a chiller including a compressor driving apparatus, the compressor driving apparatus including: a compressor including a compressor motor and a magnetic bearing; a coil driver including a switching element and to apply a current to a bearing coil of the magnetic bearing by a switching operation of the switching element to cause a rotor of the compressor motor to be levitated from or land on the magnetic bearing; and a controller to control the switching element of the coil driver, wherein, when the rotor of the compressor motor lands, the controller is configured to gradually decrease the current flowing through the bearing coil.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor driver comprising:
a compressor including a compressor motor and a magnetic bearing;
a coil driver including a switching element, wherein the coil driver applies a current to a bearing coil of the magnetic bearing by a switching operation of the switching element to cause a rotor of the compressor motor to be moved between a first state in which the rotor is positioned away from the magnetic bearing and a second state in which the rotor is positioned to contact the magnetic bearing; and
a controller to control the switching element of the coil driver, wherein, when the rotor of the compressor motor is being brought into contact with the magnetic bearing, the controller is further configured to control the switching element such that the current applied to the bearing coil decreases by less than a prescribed amount during a time period,
wherein the coil driver includes:
a capacitor to store direct current power;
a first switching element and a first diode element connected between two leads of the capacitor; and
a second diode element and a second switching element connected between the two leads of the capacitor, and connected in parallel with the first switching element and the first diode element,
wherein the bearing coil is connected between the first switching element and the first diode element, and between the second diode element and the second switching element.

2. The compressor driver of claim 1, wherein, when the rotor of the compressor motor is being brought into contact with the magnetic bearing, the controller is configured to control the switching element such that first and second modes alternate with each other, the first mode being a mode in which current stored in the bearing coil is discharged, and the second mode being a mode in which current flows to the bearing coil based on power stored in a capacitor.

3. The compressor driver of claim 1, wherein, when the rotor of the compressor motor is being brought into contact with the magnetic bearing, the controller is configured to control the switching element to alternate between a first mode that includes turning on either the first switching element or the second switching element and a second mode that includes turning on both the first switching element and the second switching element based on power stored in the capacitor.

4. The compressor driver of claim 1, wherein the controller is configured to control the switching element to, as periods in which the rotor of the compressor motor is being positioned away from the magnetic bearing and rotated increase, decrease a first period that includes turning on either the first switching element or the second switching element and a second period that includes turning on both the first switching element and the second switching element, during which the rotor of the compressor motor is being brought into contact with the magnetic bearing.

5. The compressor driver of claim 1, wherein, when the rotor of the compressor motor is being brought into contact with the magnetic bearing, the controller is configured to sequentially increase a first period that includes turning on either the first switching element or the second switching element and a second period that includes turning on both the first switching element and the second switching element.

6. The compressor driver of claim 1, further comprising:
a bearing coil current detector that detects the current applied to the bearing coil; and
a gap sensor that senses the gap between the bearing coil and the rotor,
wherein the controller is further configured to output a switching control signal to control the first switching element and the second switching element based on the gap sensed by the gap sensor and the detected current applied to the bearing coil.

7. The compressor driver of claim 2, wherein, when the rotor of the compressor motor is being positioned away from the magnetic bearing, the controller is configured to control the switching element such that:
the second mode and the first mode alternate with each other, and
a first period for the first mode and a second period for the second mode, during which the rotor of the compressor motor is brought into contact with the magnetic bearing, are respectively shorter than a third period for the first mode and a fourth period for the second mode, during which the rotor of the compressor motor is being positioned away from the magnetic bearing.

8. The compressor driver of claim 2, wherein, when the rotor of the compressor motor is being positioned away from the magnetic bearing and rotates, the controller is configured to control the switching element such that:
the first mode and the second mode alternate with each other, and
a first period for the first mode and a second period for the second mode, during which the rotor of the compressor motor is brought into contact with the magnetic bearing, are respectively longer than a fifth period for the first mode and a sixth period for the second mode, during the rotation of the rotor of the compressor motor.

9. The compressor driver of claim 2, wherein the controller is configured to control the switching element such that, as respective periods when the rotor of the compressor motor is being positioned away from the magnetic bearing and rotates increase, a first period for the first mode and a second period for the second mode, while the rotor of the compressor motor is being brought into contact with the magnetic bearing decrease.

10. The compressor driver of claim 2, wherein, when the rotor of the compressor motor is being brought into contact with the magnetic bearing, the controller is configured to control the switching element to sequentially increase a first period for the first mode and a second period for the second mode.

11. The compressor driver of claim 3, wherein, when the rotor of the compressor motor is being positioned away from the magnetic bearing, the controller is configured to control the switching element to alternate the second mode and the first mode with each other, and
a first period that includes turning on either the first switching element or the second switching element and a second period that includes turning on both the first switching element and the second switching element, while the rotor of the compressor motor is being brought into contact with the magnetic bearing, are respectively shorter than a third period for the first mode and a fourth period for turning on both the first switching element and the second switching element, in which the rotor of the compressor motor is being positioned away from the magnetic bearing.

12. The compressor driver of claim 3, wherein, when rotor of the compressor motor is being positioned away from the magnetic bearing and rotates, the first mode and the second mode alternate with each other, and
a first period that includes turning on either the first switching element or the second switching element and a second period that includes turning on both the first switching element and the second switching element, during which the rotor of the compressor motor is being brought into contact with the magnetic bearing, are respectively longer than a fifth period that includes turning on either the first switching element or the second switching element and a sixth period that includes turning on both the first switching element and the second switching element, during which the rotor of the compressor motor is being positioned away from the magnetic bearing and rotated.

13. The compressor driver of claim 6, wherein the controller includes:
a current command generator to output a current command value based on the gap sensed by the gap sensor and a gap command value; and
a duty command generator to output a duty command value based on the current command value and the detected current applied to the bearing coil.

14. A compressor driver comprising:

a compressor including a compressor motor and a magnetic bearing;
a coil driver including a switching element, wherein the coil driver applies a current to a bearing coil of the magnetic bearing by a switching operation of the switching element to cause a rotor of the compressor motor to be moved between a first state in which the rotor is positioned away from the magnetic bearing and a second state in which the rotor is positioned to contact the magnetic bearing; and
a controller to control the switching element of the coil driver, wherein, when the rotor of the compressor motor is being brought into contact with the magnetic bearing, the controller is further configured to control the switching element such that the current applied to the bearing coil decreases by less than a prescribed amount during a time period,
wherein, when the rotor of the compressor motor is being brought into contact with the magnetic bearing, the controller is configured to control the switching element such that first and second modes alternate with each other, the first mode being a mode in which current stored in the bearing coil is discharged, and the second mode being a mode in which current flows to the bearing coil based on power stored in a capacitor, and
wherein the controller is configured to control the switching element to increase a period when the rotor of the compressor motor is being moved to the second state in which the rotor is positioned to contact the magnetic bearing as respective periods when the rotor of the compressor motor is being moved to the first state in which the rotor is positioned away from the magnetic bearing and rotates increase.

15. A chiller comprising:
a compressor including a compressor motor and a magnetic bearing;
a coil driver including a switching element and to apply a current to a bearing coil of the magnetic bearing by a switching operation of the switching element to cause a rotor of the compressor motor to be moved between a first state in which the rotor is positioned away from the magnetic bearing and a second state in which the rotor is positioned to contact the magnetic bearing; and
a controller to control the switching element of the coil driver, wherein, when the rotor of the compressor motor is being brought into contact with the magnetic bearing, the controller is configured to decrease the current applied to the bearing coil by less than a threshold amount during a time period,
wherein the coil driver includes:
a capacitor to store direct current power;
a first switching element and a first diode element connected between two leads of the capacitor; and
a second diode element and a second switching element connected between the two leads of the capacitor and connected in parallel with the first switching element and the first diode element,
wherein the bearing coil is connected between the first switching element and the first diode element and between the second diode element and the second switching element.

16. The chiller of claim 15, further comprising:
an air conditioner;
a cooling tower that supplies cooling water to the air conditioner; and
an air handler or fan coiler where chilled water exchanging heat with the air conditioner is circulated,
wherein the air conditioner includes:
an evaporator to perform heat transfer;
the compressor to compress refrigerant coming from the evaporator; and
a condenser to condense the refrigerant coming from the compressor.

17. A compressor driver comprising:
a compressor including a compressor motor and a magnetic bearing;
a coil driver including a switching element, wherein the coil driver applies a current to a bearing coil of the magnetic bearing by a switching operation of the switching element to cause a rotor of the compressor motor to be moved between a first state in which the rotor is positioned away from the magnetic bearing and a second state in which the rotor is positioned to contact the magnetic bearing; and
a controller to control the switching element of the coil driver, wherein, when the rotor of the compressor motor is being brought into contact with the magnetic bearing, the controller is further configured to control the switching element moves at less than a prescribed velocity,
wherein the coil driver includes:
a capacitor to store direct current power;
a first switching element and a first diode element connected between two leads of the capacitor; and
a second diode element and a second switching element connected between the two leads of the capacitor and connected in parallel with the first switching element and the first diode element,
wherein the bearing coil is connected between the first switching element and the first diode element and between the second diode element and the second switching element.

18. The compressor driver of claim 17, wherein, when the rotor of the compressor motor is being brought into contact with the magnetic bearing, the controller is configured to control the switching element to alternate between a first mode that includes turning on either the first switching element or the second switching element and a second mode that includes turning on both the first switching element and the second switching element based on power stored in the capacitor.

19. The compressor driver of claim 18, wherein, when the rotor of the compressor motor is being positioned away from the magnetic bearing, the controller is configured to control the switching element such that:
the second mode and the first mode alternate with each other, and
a first period for the first mode and a second period for the second mode, during which the rotor of the compressor motor is brought into contact with the magnetic bearing, are respectively shorter than a third period for the first mode and a fourth period for the second mode, during which the rotor of the compressor motor is being positioned away from the magnetic bearing.

20. The compressor driver of claim 18, wherein, when the rotor of the compressor motor is being positioned away from the magnetic bearing and rotates, the controller is configured to control the switching element such that:
the first mode and the second mode alternate with each other, and
a first period for the first mode and a second period for the second mode, during which the rotor of the compressor motor is brought into contact with the magnetic bearing, are respectively longer than a fifth period for the first mode and a sixth period for the second mode, during the rotation of the rotor of the compressor motor.

\* \* \* \* \*